US007543381B2

(12) United States Patent
Ogawa et al.

(10) Patent No.: US 7,543,381 B2
(45) Date of Patent: Jun. 9, 2009

(54) METHOD OF MANUFACTURING A LIQUID EJECTING HEAD

(75) Inventors: Hideyuki Ogawa, Nagano (JP); Koichi Saito, Nagano (JP); Nagamitsu Takashima, Nagano (JP); Nobuyuki Soma, Nagano (JP); Katsunori Ono, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 181 days.

(21) Appl. No.: 11/413,591

(22) Filed: Apr. 28, 2006

(65) Prior Publication Data

US 2006/0191389 A1 Aug. 31, 2006

Related U.S. Application Data

(62) Division of application No. 11/213,837, filed on Aug. 30, 2005.

(30) Foreign Application Priority Data

Aug. 30, 2004 (JP) .......................... P2004-249598
Sep. 1, 2004 (JP) .......................... P2004-253846

(51) Int. Cl.
*B23P 17/00* (2006.01)

(52) U.S. Cl. .................... 29/890.1; 29/890.09; 347/44; 347/45

(58) Field of Classification Search ................ 29/890.1, 29/830, 831, 832, 896.627, 890.09, 465; 216/27; 347/68–71, 20, 54, 44–47; 239/548, 239/553; 83/622, 636, 686, 425.2; 72/186, 72/196, 326
See application file for complete search history.

(56) References Cited

U.S. PATENT DOCUMENTS

| | | | | |
|---|---|---|---|---|
| 530,560 | A | 12/1894 | Swaney | |
| 1,398,320 | A | 11/1921 | Dunsworth | |
| 4,428,709 | A * | 1/1984 | Peters | 414/412 |
| 4,898,056 | A | 2/1990 | Grobb et al. | |
| 5,509,773 | A * | 4/1996 | Connor et al. | 414/412 |
| 6,165,595 | A * | 12/2000 | Kumagai et al. | 428/209 |
| 6,606,926 | B1 | 8/2003 | Tsuji et al. | |
| 2003/0121995 | A1 * | 7/2003 | Akahane et al. | 239/548 |

FOREIGN PATENT DOCUMENTS

JP 2004-98164 A 4/2004

* cited by examiner

*Primary Examiner*—Minh Trinh
*Assistant Examiner*—Tai Nguyen
(74) *Attorney, Agent, or Firm*—Sughrue Mion, PLLC

(57) ABSTRACT

A punching apparatus forms a hole at a bottom portion of each of recesses which are formed in a metal plate in advance and arrayed in a first direction. A female die supports the metal plate. A male die is opposed to the recess and provided with a punch array in which a plurality of punches in the first direction. The male die is movable in a second direction perpendicular to the first direction to form the hole with each of the punches. The punches include first punches each having a distal end face which is slant in the second direction. A slant angle of the distal end face corresponds to a warp of the plate member due to the formation of the recesses.

3 Claims, 29 Drawing Sheets

FIG. 11A
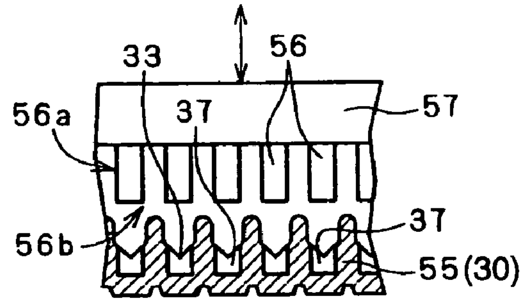
FIG. 11B
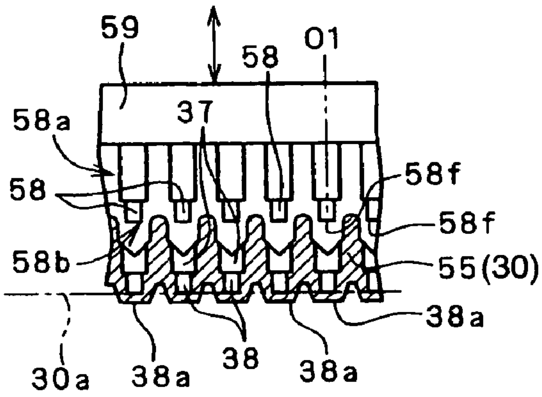
FIG. 11C
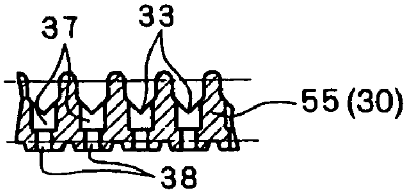
FIG. 11D
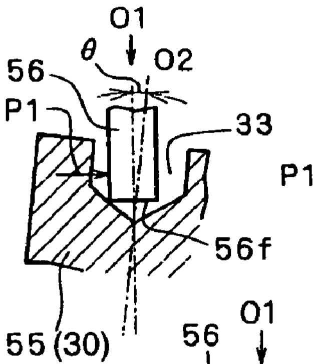
FIG. 11E
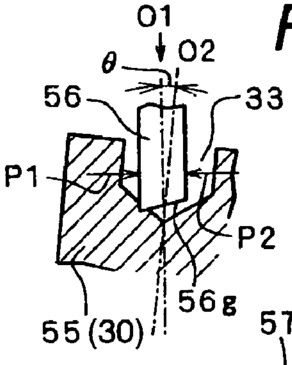
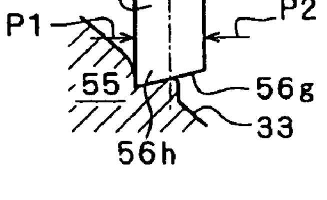
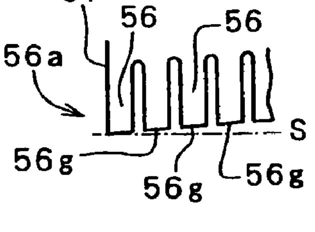
FIG. 11G
FIG. 11F

METHOD OF MANUFACTURING A LIQUID EJECTING HEAD

This is a divisional of application Ser. No. 11/213,837 filed Aug. 30, 2005. The entire disclosure of the prior application, application Ser. No. 11/213,837 is hereby incorporated by reference.

BACKGROUND OF THE INVENTION

The present invention relates to a working method for forming circular, rectangular, or-shaped minute holes of about 0.5 mm or less in diameter or longer-side length in a metal plate by press working, and a tool used in the method. The present invention also relates to an apparatus and method for manufacturing a liquid ejecting head incorporating the worked metal plate.

An ink jet recording head (hereinafter, referred to as "recording head") used as an example of a liquid ejecting head is provided with a plurality of series of flow paths reaching nozzle orifices from a common ink reservoir via pressure generating chambers in correspondence with the orifices. Further, the respective pressure generating chambers need to form by a fine pitch in correspondence with a recording density to meet a request of downsizing. Therefore, a wall thickness of a partition wall for partitioning contiguous ones of the pressure generating chambers is extremely thinned. Further, an ink supply port for communicating the pressure generating chamber and the common ink reservoir is more narrowed than the pressure generating chamber in a flow path width thereof in order to use ink pressure at inside of the pressure generating chamber efficiently for ejection of ink drops.

The pressure generating chambers and communicating ports etc. that connect the pressure chambers to the nozzle orifices, respectively, are formed by performing plastic working on a metal plate (see Japanese Patent Publication 2004-98164A, for example). In particular, since the communicating ports are formed after forming the pressure generating chambers, the working for forming the communicating ports is required to be suitable for the state of deformation of a chamber formation plate that has occurred at the time of formation of the pressure generating chambers.

When a male die and a female die are returned to original positions from a state that the operation strokes of the male die and the female die have taken maximum values and plastic deformation of a chamber formation plate (metal plate) placed between the male die and the female die has completed, the chamber formation plate that has been released from the male die and the female die is gently warped in the arrayed direction of elongated recess portions which are to be pressure generating chambers due to internal stress. If the chamber formation plate is placed generally horizontally with the openings of the elongated recess portions located above and the bottoms of the elongated recess portions located below, the warped shape is such that the ends in the arrayed direction of the elongated recess portions are highest and the height decreases gradually as the position goes from the ends to the center.

To form communicating ports in the bottom portions of the elongated recess portions that are arranged along such a warped shape, an array of punches having the same pitch as the arrayed pitch of the pressure generating chambers is prepared. However, since the tips of the large number of punches are arranged in a row, as the punches are moved in the depth direction of the elongated recess portions, the end punches or punches close to those first dig into the bottom portions of the end elongated recess portions or elongated recess portions close to those and then the remaining punches dig into the corresponding elongated recess portions in order from the outside to the center.

As the punches dig into the bottom portions, forces act on the end punches or punches close to those in such directions as to move those punches toward the center of the punch array. Therefore, the end punches or punches close to those may be bent toward the center of the punch array or broken. If punches are bent in such a manner, the corresponding communicating port working positions are deviated, which means reduction in working accuracy. In addition, the durability of the end punches or punches close to those is lowered and their lives are shortened, which is uneconomical. If a punch is broken, production is suspended for its replacement and various processing costs occur, which is also uneconomical. Further, since the communicating ports to be formed in the pressure generating chambers are very minute, the punches are long and very narrow and accordingly their rigidity tends to be insufficient for the working resistance. The above problems are more serious in this respect.

The above problems relate to the rigidity of each punch in the arrayed direction of the elongated recess portions. On the other hand, it is also important to secure sufficient rigidity of each punch in the longitudinal direction of the associated elongated recess portion, that is, pressure generating chamber.

SUMMARY OF THE INVENTION

It is an object of the invention to provide a working method capable of forming minute holes in a metal plate with high accuracy by plastic working, and a tool used in the method.

It is also an object of the invention to provide, an apparatus and a method for manufacturing a liquid ejecting head incorporating the worked metal plate.

In order to achieve the above object, according to the invention, there is provided a punching apparatus for forming a hole at a bottom portion of each of recesses which are formed in a metal plate in advance and arrayed in a first direction, comprising:

a female die, adapted to support the metal plate; and a male die, adapted to be opposed to the recess and comprising a punch array in which a plurality of punches in the first direction, wherein:

the male die is movable in a second direction perpendicular to the first direction to form the hole with each of the punches;

the punches include first punches each having a distal end face which is slant in the second direction; and a slant angle of the distal end face corresponds to a warp of the plate member due to the formation of the recesses.

The recesses and the punches may be arrayed with a fixed pitch.

The first punches may be provided at least in both ends of the punch array.

A cross section of each of the punches in the first direction may be rectangular.

A first part of the distal end face which is closer to an end of the punch array may be closer to the female die than a second part of the distal end face which is closer to a center of the punch array.

Here, the punches may be arrayed such that a contour line of the punch array defined by connecting respective distal end faces of the punches includes first parts assuming straight lines. Here, a first portion of each of the straight lines which is closer to the end of the punch array is closer to the female die than a second portion of each of the straight lines which is closer to the center of the punch array.

Here, the contour line may include a second part located between the first parts and assuming a straight line extending in the first direction.

Here, the second part of the contour line may be closer to the female die than the second portion of each of the first part.

The punches may be arrayed such that a contour line of the punch array defined by connecting respective distal end faces of the punches includes parts assuming curved lines. Here, a first portion of each of the curved lines which is closer to the end of the punch array is closer to the female die than a second portion of each of the curved lines which is closer to the center of the punch array.

Here, the contour line may include a second part located between the first parts and assuming a straight line extending in the first direction.

Here, the second part of the contour line may be closer to the female die than the second portion of each of the first part.

A first part of the distal end face which is closer to an end of the punch array may be farther from the female die than a second part of the distal end face which is closer to a center of the punch array.

Here, the punches may be arrayed such that a contour line of the punch array defined by connecting respective distal end faces of the punches includes first parts assuming straight lines. Here, a first portion of each of the straight lines which is closer to the end of the punch array is farther from the female die than a second portion of each of the straight lines which is closer to the center of the punch array.

Here, the contour line may include a second part located between the first parts and assuming a straight line extending in the first direction.

The punches may be arrayed such that a contour line of the punch array defined by connecting respective distal end faces of the punches includes parts assuming curved lines. Here, a first portion of each of the curved lines which is closer to the end of the punch array is farther from the female die than a second portion of each of the curved lines which is closer to the center of the punch array.

Here, the contour line may include a second part located between the first parts and assuming a straight line extending in the first direction.

According to the invention, there is also provided a punching apparatus for forming a hole at a bottom portion of each of recesses which are formed in a metal plate in advance and arrayed in a first direction, comprising:

a female die, adapted to support the metal plate; and a male die, adapted to be opposed to the recess and comprising a punch array in which a plurality of punches in the first direction, wherein:

the male die is movable in a second direction perpendicular to the first direction to form the hole with each of the punches;

a contour line of the punch array defined by connecting respective distal end faces of the punches includes a plurality of parts assuming straight lines extending in the first direction; and one of straight lines which is closer to an end of the punch array is farther from the female die than one of the straight lines which is closer to a center of the punch array, in accordance with a warp of the plate member due to the formation of the recesses.

According to the invention, there is also provided a method of manufacturing a liquid ejection head, comprising:

providing a first metal plate;

supporting the first metal plate on a female die;

forming a plurality of recesses in the first metal plate so as to be arrayed in a first direction;

opposing a male die to the recess, the male die comprising a punch array in which a plurality of punches arrayed in the first direction;

actuating the male die in a second direction perpendicular to the first direction to form a through hole at a bottom portion of each of the recesses with each of the punches;

providing a second metal plate formed with a plurality of nozzle orifices; and joining the first metal plate and the second metal plate such that each of the nozzle orifices is communicated with one of the recesses, wherein:

the punches include first punches each having a distal end face which is slant in the second direction; and a slant angle of the distal end face corresponds to a warp of the plate member due to the formation of the recesses.

According to the invention, there is also provided a method of manufacturing a liquid ejection head, comprising:

providing a first metal plate;

supporting the first metal plate on a female die;

forming a plurality of recesses in the first metal plate so as to be arrayed in a first direction;

opposing a male die to the recess, the male die comprising a punch array in which a plurality of punches arrayed in the first direction;

actuating the male die in a second direction perpendicular to the first direction to form a through hole at a bottom portion of each of the recesses with each of the punches;

providing a second metal plate formed with a plurality of nozzle orifices; and joining the first metal plate and the second metal plate such that each of the nozzle orifices is communicated with one of the recesses, wherein:

a contour line of the punch array defined by connecting respective distal end faces of the punches includes a plurality of parts assuming straight lines extending in the first direction; and one of straight lines which is closer to an end of the punch array is farther from the female die than one of the straight lines which is closer to a center of the punch array, in accordance with a warp of the plate member due to the formation of the recesses.

According to the invention, there is also provided a method of punching a metal plate, comprising:

supporting the metal plate on a female die;

forming a plurality of recesses in the metal plate so as to be arrayed in a first direction;

opposing a male die to the recess, the male die comprising a punch array in which a plurality of punches arrayed in the first direction; and actuating the male die in a second direction perpendicular to the first direction to form a hole at a bottom portion of each of the recesses with each of the punches, wherein:

the punches include first punches each having a distal end face which is slant in the second direction; and a slant angle of the distal end face corresponds to a warp of the plate member due to the formation of the recesses.

A cross section of the bottom portion of each of the recesses in the first direction may be V-shaped.

According to the invention, there is also provided a method of punching a metal plate, comprising:

supporting the metal plate on a female die;

forming a plurality of recesses in the metal plate so as to be arrayed in a first direction;

opposing a male die to the recess, the male die comprising a punch array in which a plurality of punches arrayed in the first direction; and actuating the male die in a second direction perpendicular to the first direction to form a hole at a bottom portion of each of the recesses with each of the punches, wherein:

a contour line of the punch array defined by connecting respective distal end faces of the punches includes a plurality of parts assuming straight lines extending in the first direction; and one of straight lines which is closer to an end of the punch array is farther from the female die than one of the straight lines which is closer to a center of the punch array, in accordance with a warp of the plate member due to the formation of the recesses.

A cross section of the bottom portion of each of the recesses in the first direction may be V-shaped.

With some of the above configurations, since the bending force generated by the warped metal plate against the punches is canceled or considerably reduced, no inclinations etc. occur in the punches at and near the ends of the punch array, and hence an array of minute holes can be formed in the metal plate correctly at prescribed positions.

Therefore, reduction in working accuracy due to the warp of the metal plate can be prevented and high quality can be attained in accuracy. In addition, since the bending loads on the punches at and near the ends are reduced, an event that punches at particular positions are bent or broken does not occur and hence the durability of the punches can be increased. The above advantages are particularly effective in forming an array of minute holes in a liquid ejecting head, for example.

With some of the above configurations, since the punches of the punch array are dug into the bottom portions of the recesses almost simultaneously, the working shapes of the respective recesses are made uniform. That is, reduction in working accuracy due to the warp of the metal plate can be prevented and high quality can be attained in accuracy. Further, since no unevenness occurs in the working loads on the respective punches, there does not occur an event that punches at particular positions are bent or broken. The durability of the punches can thus be increased. The above advantages are particularly effective in forming an array of minute holes in a liquid ejecting head, for example.

BRIEF DESCRIPTION OF THE DRAWINGS

The above objects and advantages of the present invention will become more apparent by describing in detail preferred exemplary embodiments thereof with reference to the accompanying drawings, wherein:

FIG. 11A is a section view for explaining a second male die used in forming first communicating ports, according to a first embodiment of the invention;

FIG. 11B is a section view for explaining a third male die used in forming second communicating ports, according to the first embodiment of the invention;

FIG. 11C is a section view for explaining a grinding step;

FIG. 11D is a section view showing a comparative example of a distal end of a first punch in the second male die;

FIG. 11E is a section view showing a distal end of a first punch in the second male die of FIG. 11A;

FIG. 11F is a diagram showing a part in the vicinity of an end of a first punch array in the second male die of FIG. 11A;

FIG. 11G is a section view for explaining how the distal end of the first punch of FIG. 11E cuts into the metal plate;

DETAILED DESCRIPTION OF THE EMBODIMENTS

Embodiments of the invention will be described below with reference to the accompanying drawings. Firstly, the constitution of a liquid ejecting head will be described.

Since it is preferable to apply the invention to a recording head of an ink jet recording apparatus, as an example representative of the liquid ejecting head, the above recording head is shown in the embodiment.

Figure 1:
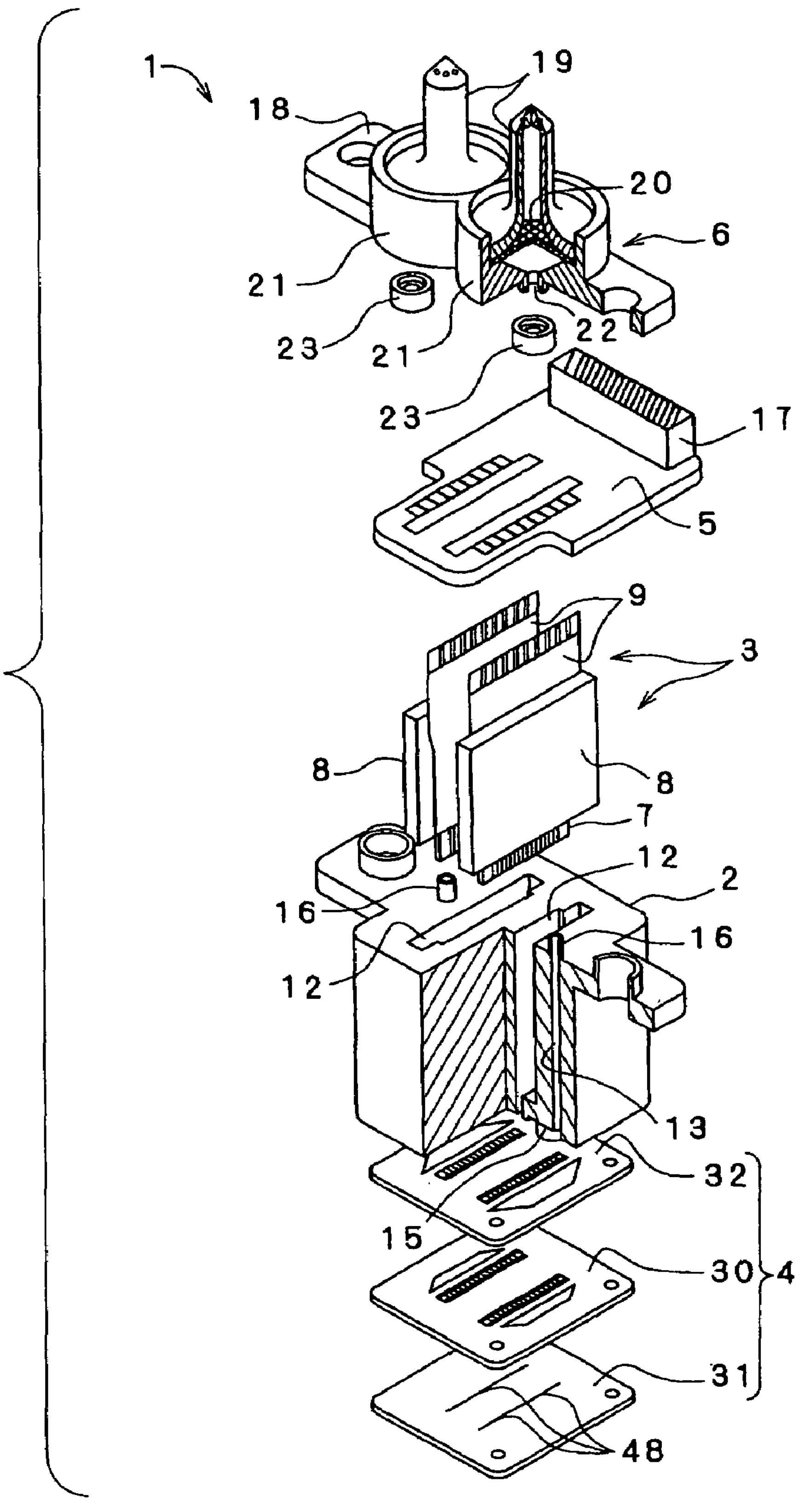
FIG. 1 is a perspective view of a disassembled ink jet recording head according to a first embodiment of the invention.
Figure 2:
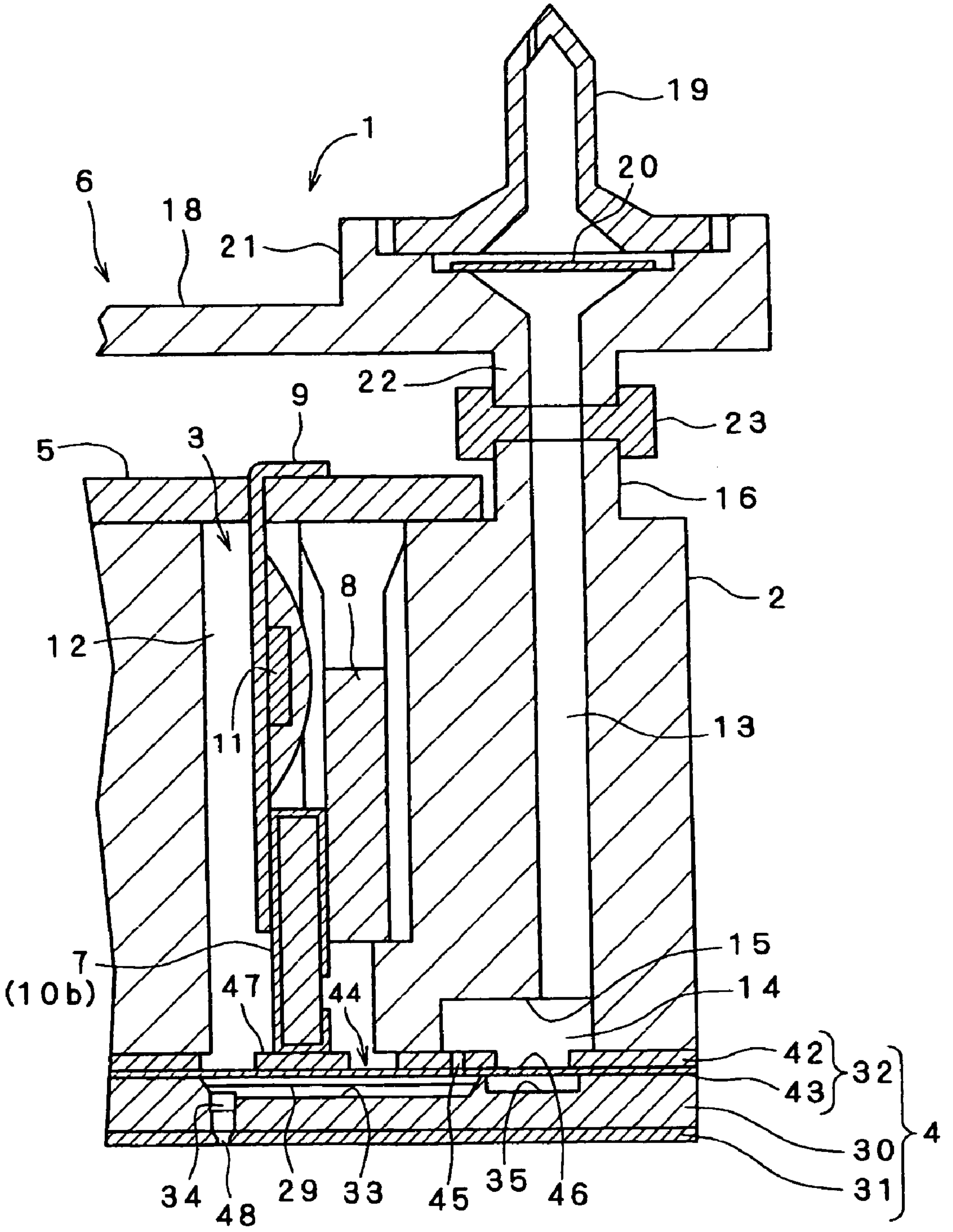
FIG. 2 is a sectional view of the ink jet recording head.

As shown in FIGS. 1 and 2, a recording head 1 is roughly constituted by a casing 2, a vibrator unit 3 contained at inside of the casing 2, a flow path unit 4 bonded to a front end face of the casing 2, a connection board 5 arranged onto a rear end face of the casing 2, a supply needle unit 6 attached to the rear end face of the casing 2.

Figure 3A:
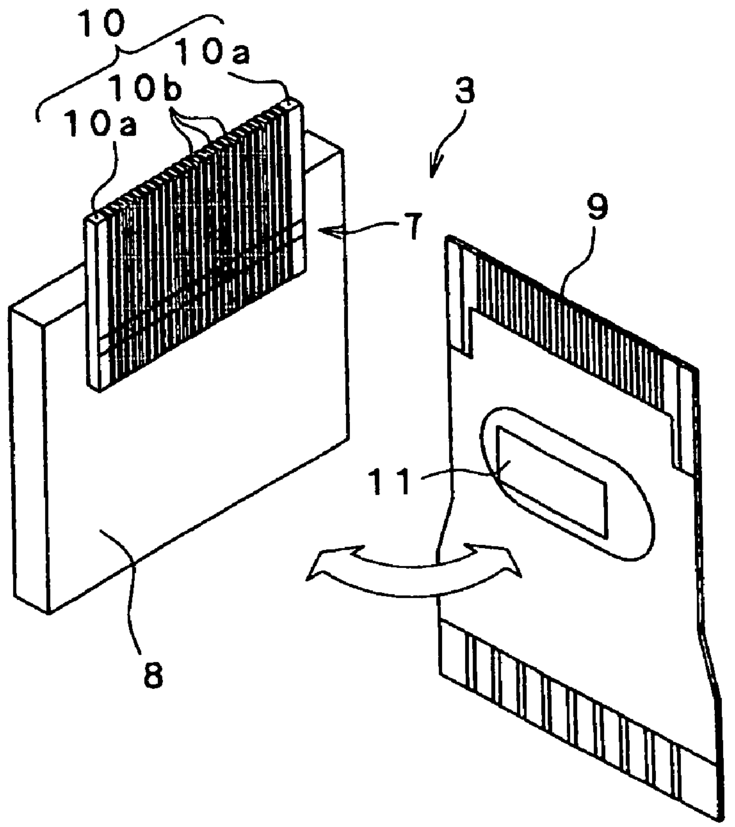
FIGS. 3A and 3B are views for explaining a vibrator unit.
Figure 3B:
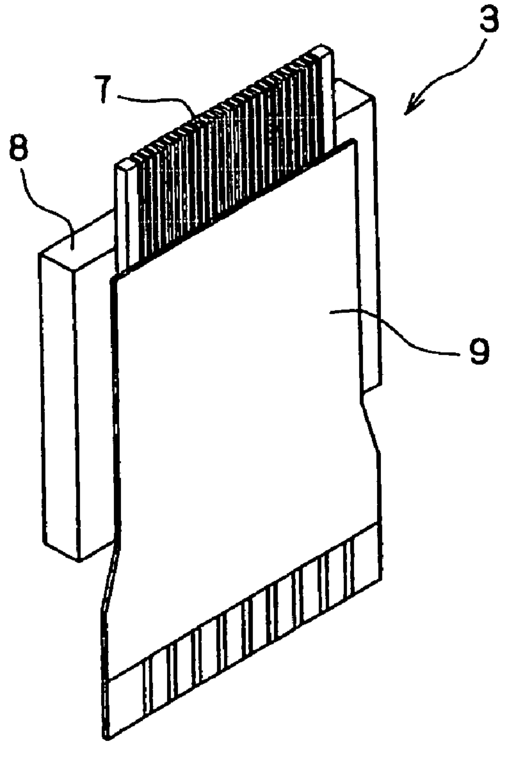

As shown in FIGS. 3A and 3B, the vibrator unit 3 is roughly constituted by a piezoelectric vibrator group 7, a fixation plate 8 bonded with the piezoelectric vibrator group 7 and a flexible cable 9 for supplying a drive signal to the piezoelectric vibrator group 7.

The piezoelectric vibrator group 7 is provided with a plurality of piezoelectric vibrators 10 formed in a shape of a row. The respective piezoelectric vibrators 10 are constituted by a pair of dummy vibrators 10*a* disposed at both ends of the array and a plurality of drive vibrators 10*b* arranged between the dummy vibrators 10*a*. Further, the respective drive vibrators 10*b* are cut to divide in a pectinated shape having an extremely slender width of, for example, about 50 μm through 100 μm, so that 180 pieces are provided.

Further, the dummy vibrator 10*a* is provided with a width sufficiently wider than that of the drive vibrator 10*b* and is provided with a function for protecting the drive vibrator 10*b* against impact or the like and a guiding function for positioning the vibrator unit 3 at a predetermined position.

A free end portion of each of the piezoelectric vibrators 10 is projected to an outer side of a front end face of the fixation plate 8 by bonding a fixed end portion thereof onto the fixation plate 8. That is, each of the piezoelectric vibrators 10 is supported on the fixation plate 8 in a cantilevered manner. Further, the free end portions of the respective piezoelectric vibrators 10 are constituted by alternately laminating piezoelectric bodies and inner electrodes so that extended and contracted in a longitudinal direction of the elements by applying a potential difference between the electrodes opposed to each other.

The flexible cable 9 is electrically connected to the piezoelectric vibrator 10 at a side face of a fixed end portion thereof constituting a side opposed to the fixation plate 8. Further, a surface of the flexible cable 9 is mounted with an IC 11 for controlling to drive the piezoelectric vibrator 10 or the like. Further, the fixation plate 8 for supporting the respective piezoelectric vibrators 10 is a plate-shaped member having a rigidity capable of receiving reaction force from the piezoelectric vibrators 10, and a metal plate of a stainless steel plate or the like is preferably used therefor.

The casing 2 is a block-shaped member molded by a thermosetting resin of an epoxy species resin or the like. Here, the casing 2 is molded by the thermosetting resin because the thermosetting resin is provided with a mechanical strength higher than that of a normal resin, a linear expansion coefficient is smaller than that of a normal resin so that deformability depending on the environmental temperature is small. Further, inside of the casing 2 is formed with a container chamber 12 capable of containing the vibrator unit 3, and an ink supply path 13 constituting a portion of a flow path of ink. Further, the front end face of the casing 2 is formed with a recess 15 for constituting a common ink reservoir 14.

The container chamber 12 is a hollow portion having a size of capable of containing the vibrator unit 3. At a portion of a front end side of the container chamber 12, a step portion is formed such that a front end face of the fixation plate 8 is brought into contact therewith.

The recess 15 is formed by partially recessing the front end face of the casing 2 so has to have a substantially trapezoidal shape formed at left and right outer sides of the container chamber 12.

The ink supply path 13 is formed to penetrate the casing 2 in a height direction thereof so that a front end thereof communicates with the recess 15. Further, a rear end portion of the ink supply path 13 is formed at inside of a connecting port 16 projected from the rear end face of the casing 2.

The connection board 5 is a wiring board formed with electric wirings for various signals supplied to the recording head 1 and provided with a connector 17 capable of connecting a signal cable. Further, the connection board 5 is arranged on the rear end face of the casing 2 and connected with electric wirings of the flexible cable 9 by soldering or the like. Further, the connector 17 is inserted with a front end of a signal cable from a control apparatus (not illustrated).

The supply needle unit 6 is a portion connected with an ink cartridge (not illustrated) and is roughly constituted by a needle holder 18, an ink supply needle 19 and a filter 20.

The ink supply needle 19 is a portion inserted into the ink cartridge for introducing ink stored in the ink cartridge. A distal end portion of the ink supply needle 19 is sharpened in a conical shape to facilitate to insert into the ink cartridge. Further, the distal end portion is bored with a plurality of ink introducing holes for communicating inside and outside of the ink supply needle 19. Further, since the recording head according to the embodiment can eject two kinds of inks, two pieces of the ink supply needles 19 are provided.

The needle holder 18 is a member for attaching the ink supply needle 19, and a surface thereof is formed with base seats 21 for two pieces of the ink supply needles 19 for fixedly attaching proximal portions of the ink supply needles 19. The base seat 21 is fabricated in a circular shape in compliance with a shape of a bottom face of the ink supply needle 19. Further, a substantially central portion of the bottom face of the base seat is formed with an ink discharge port 22 penetrated in a plate thickness direction of the needle holder 18. Further, the needle holder 18 is extended with a flange portion in a side direction.

The filter 20 is a member for hampering foreign matters at inside of ink such as dust, burr in dieing and the like from passing therethrough and is constituted by, for example, a metal net having a fine mesh. The filter 20 is adhered to a filter holding groove formed at inside of the base seat 21.

Further, as shown in FIG. 2, the supply needle unit 6 is arranged on the rear end face of the casing 2. In the arranging state, the ink discharge port 22 of the supply needle unit 6 and the connecting port 16 of the casing 2 are communicated with each other in a liquid tight state via a packing 23.

Next, the above-described flow path unit 4 will be explained. The flow path unit 4 is constructed by a constitution in which a nozzle plate 31 is bonded to one face of a chamber formation plate 30 and an elastic plate 32 is bonded to other face of the chamber formation plate 30.

Figure 4:
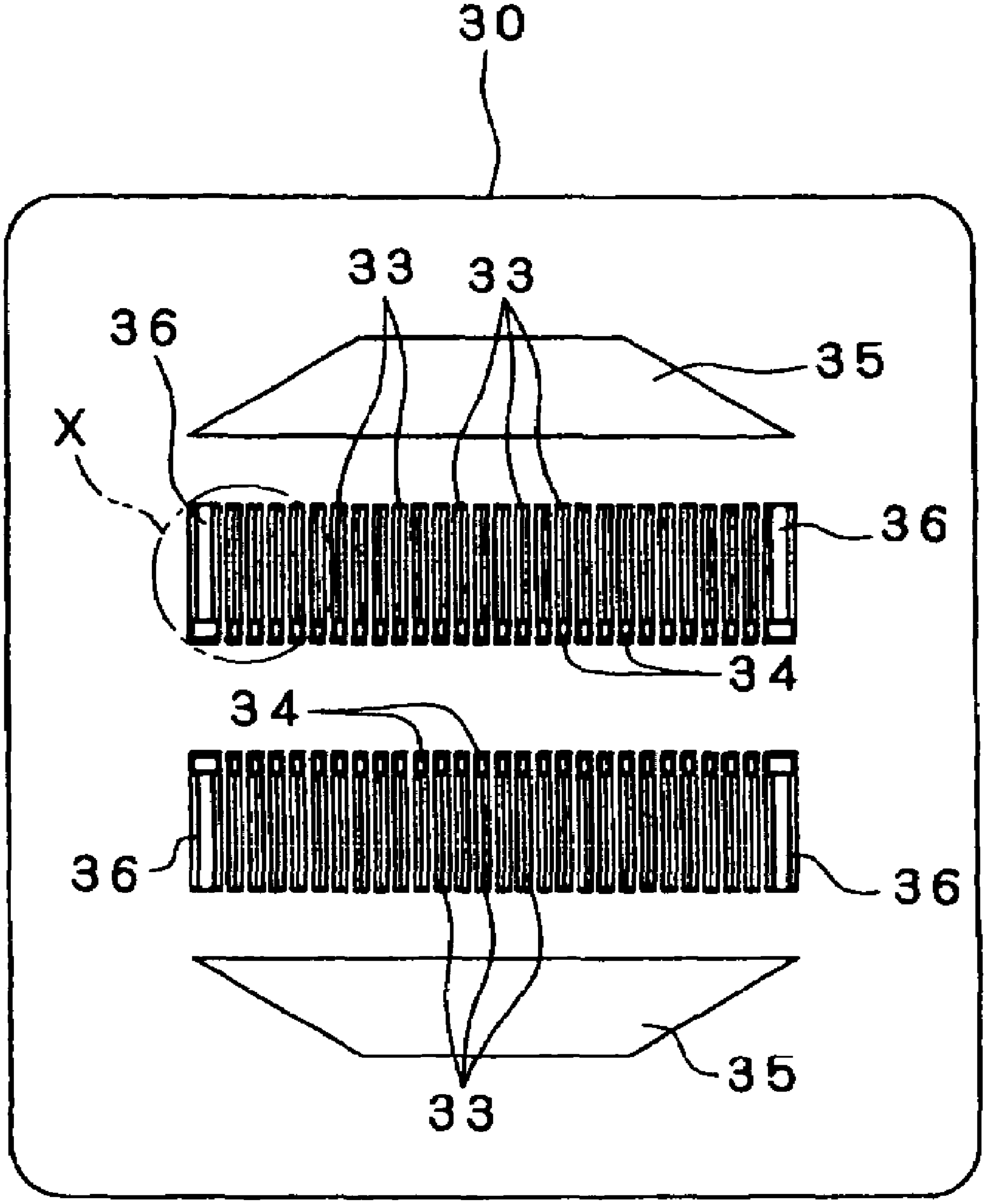
FIG. 4 is a plan view of a chamber formation plate.

As shown in FIG. 4, the chamber formation plate 30 is a plate-shaped member made of a metal formed with an elongated recess portion 33, a communicating port 34 and an escaping recess portion 35. According to the embodiment, the chamber formation plate 30 is fabricated by working a metal substrate made of nickel having a thickness of 0.35 mm.

An explanation will be given here of reason of selecting nickel of the metal substrate. First reason is that the linear expansion coefficient of nickel is substantially equal to a linear expansion coefficient of a metal (stainless steel in the embodiment as mentioned later) constituting essential portions of the nozzle plate 31 and the elastic plate 32. That is, when the linear expansion coefficients of the chamber formation plate 30, the elastic plate 32 and the nozzle plate 31 constituting the flow path unit 4 are substantially equal, in heating and adhering the respective members, the respective members are uniformly expanded.

Therefore, mechanical stress of warping or the like caused by a difference in the expansion rates is difficult to generate. As a result, even when the adhering temperature is set to high temperature, the respective members can be adhered to each other without trouble. Further, even when the piezoelectric vibrator 10 generates heat in operating the recording head 1 and the flow path unit 4 is heated by the heat, the respective members 30, 31 and 32 constituting the flow path unit 4 are uniformly expanded. Therefore, even when heating accompanied by activating the recording head 1 and cooling accompanied by deactivating are repeatedly carried out, a drawback of exfoliation or the like is difficult to be brought about in the respective members 30, 31 and 32 constituting the flow path unit 4.

Second reason is that nickel is excellent in corrosion resistance. That is, aqueous ink is preferably used in the recording head 1 of this kind, it is important that alteration of rust or the like is not brought about even when the recording head 1 is brought into contact with water over a long time period. In this respect, nickel is excellent in corrosion resistance similar to stainless steel and alteration of rust or the like is difficult to be brought about.

Third reason is that nickel is rich in ductility. That is, in manufacturing the chamber formation plate 30, as mentioned later, the fabrication is carried out by plastic working (for example, forging). Further, the elongated recess portion 33 and the communicating port 34 formed in the chamber formation plate 30 are of extremely small shapes and high dimensional accuracy is requested therefor. When nickel is used for the metal substrate, since nickel is rich in ductility, the elongated recess portion 33 and the communicating port 34 can be formed with high dimensional accuracy even by plastic working.

Further, with regard to the chamber formation plate 30, the chamber formation plate 30 may be constituted by a metal other than nickel when the condition of the linear expansion coefficient, the condition of the corrosion resistance and the condition of the ductility are satisfied.

Figure 5A:
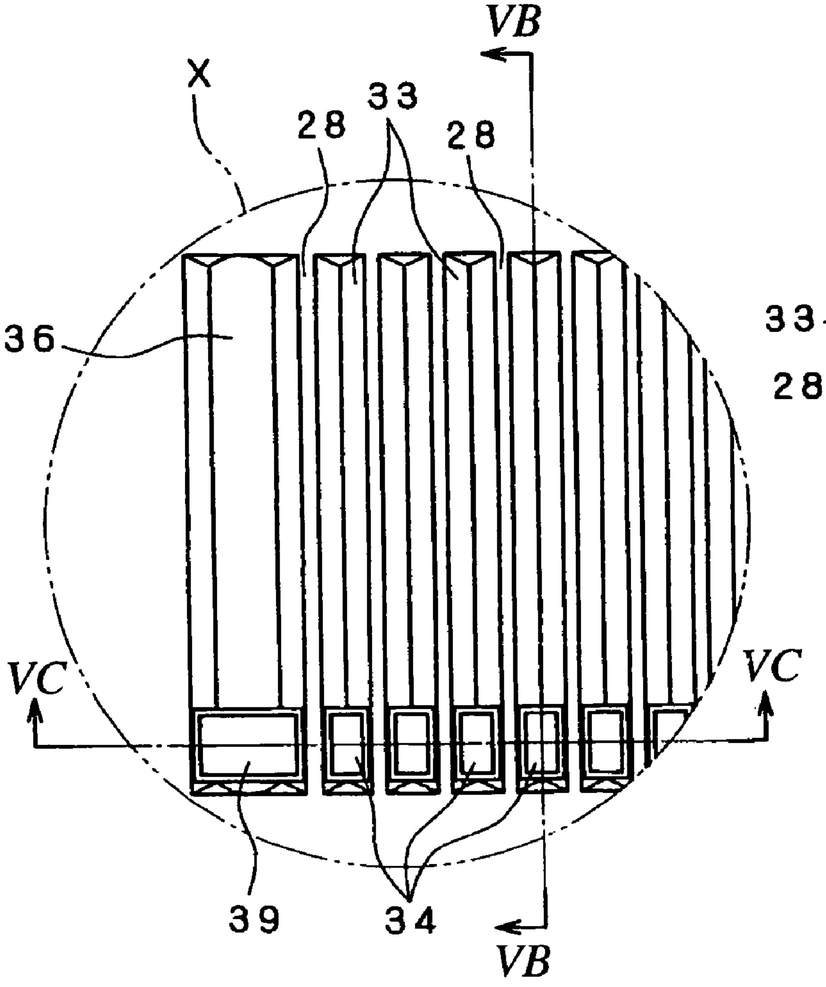
FIG. 5A is a view enlarging an X portion in FIG. 4.
Figure 5B:
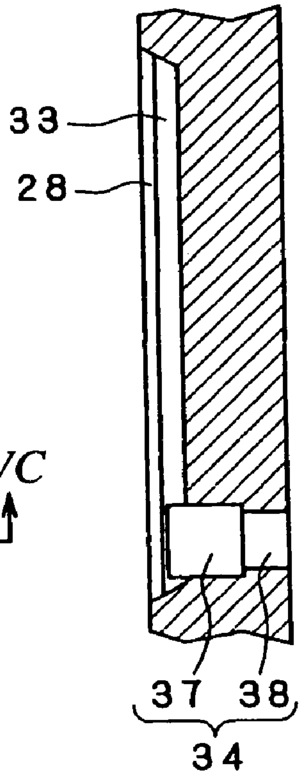
FIG. 5B is a sectional view taken along a line VB-VB of FIG. 5A.
Figure 5C:
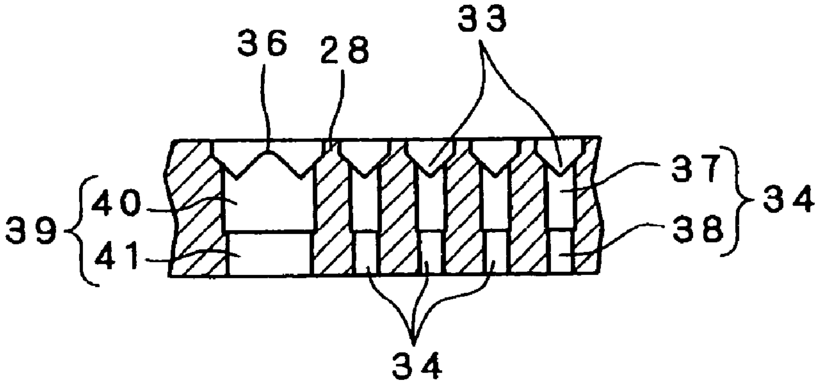
FIG. 5C is a sectional view taken along a line VC-VC of FIG. 5A.

The elongated recess portion 33 is a groove-shaped recess portion constituting a pressure generating chamber 29 and is constituted by a groove in a linear shape as shown to enlarge in FIG. 5A. According to the embodiment, 180 pieces of grooves each having a width of about 0.1 mm, a length of about 1.5 mm and a depth of about 0.1 mm are aligned side by side. A bottom face of the elongated recess portion 33 is recessed in a V-shaped shape by reducing a width thereof as progressing in a depth direction (that is, depth side). The bottom face is recessed in the V-shaped shape to increase a rigidity of a partition wall 28 for partitioning the contiguous pressure generating chambers 29. That is, by recessing the bottom face in the V-shaped shape, a wall thickness of the proximal portion of the partition wall 28 is thickened to increase the rigidity of the partition wall 28. Further, when the rigidity of the partition wall 28 is increased, influence of pressure variation from the contiguous pressure generating chamber 29 is difficult to be effected. That is, a variation of ink pressure from the contiguous pressure generating chamber 29 is difficult to transmit. Further, by recessing the bottom face in the V-shaped shape, the elongated recess portion 33 can be formed with excellent dimensional accuracy by plastic working (to be mentioned later). Further, an angle between the inner faces of the recess portion 33 is, for example, around 90 degrees although prescribed by a working condition.

Further, since a wall thickness of a distal end portion of the partitioning wall 28 is extremely thin, even when the respective pressure generating chambers 29 are densely formed, a necessary volume can be ensured.

Both longitudinal end portions of the elongated recess portion 33 are sloped downwardly to inner sides as progressing to the depth side. The both end portions are constituted in this way to form the elongated recess portion 33 with excellent dimensional accuracy by plastic working.

Further, contiguous to the elongated recess portion 33 at the both ends of the row, there are formed single ones of dummy recesses 36 having a width wider than that of the elongated recess portion 33. The dummy recess portion 36 is a recess portion in a groove-shaped shape constituting a dummy pressure generating chamber which is not related to ejection of ink drops. The dummy recess portion 36 according to the embodiment is constituted by a groove having a width of about 0.2 mm, a length of about 1.5 mm and a depth of about 0.1 mm. Further, a bottom face of the dummy recess portion 36 is recessed in a W-shaped shape. This is also for increasing the rigidity of the partition wall 28 and forming the dummy recess portion 36 with excellent dimensional accuracy by plastic working.

Further, an array of recesses is constituted by the respective elongated recess portions 33 and the pair of dummy recess portions 36. According to the embodiment, two rows of the recesses are formed as shown in FIG. 4.

The communicating port 34 is formed as a small through hole penetrating from one end of the elongated recess portion 33 in a plate thickness direction. The communicating ports 34 are formed for respective ones of the elongated recess portions 33 and are formed by 180 pieces in a single recess portion array. The communicating port 34 of the embodiment is in a rectangular shape in an opening shape thereof and is constituted by a first communicating port 37 formed from a side of the elongated recess portion 33 to a middle in the plate thickness direction in the chamber formation plate 30 and a second communicating port 38 formed from a surface thereof on a side opposed to the elongated recess portion 33 up to a middle in the plate thickness direction.

Further, sectional areas of the first communicating port 37 and the second communicating port 38 differ from each other and an inner dimension of the second communicating port 38 is set to be slightly smaller than an inner dimension of the first communicating port 37. This is caused by manufacturing the communicating port 34 by pressing. The chamber formation plate 30 is fabricated by working a nickel plate having a thickness of 0.35 mm, a length of the communicating port 34 becomes equal to or larger than 0.25 mm even when the depth of the recess portion 33 is subtracted. Further, the width of the communicating port 34 needs to be narrower than the groove width of the elongated recess portion 33, set to be less than 0.1 mm. Therefore, when the communicating port 34 is going to be punched through by a single time of working, a male die (punch) is buckled due to an aspect ratio thereof.

Therefore, in the embodiment, the working is divided into two steps. In the first step, the first communicating port 37 is formed halfway in the plate thickness direction, and in the second step, the second communicating port 38 is formed. The working process of this communicating port 34 will be described later.

Further, the dummy recess portion 36 is formed with a dummy communicating port 39. Similar to the above-described communicating port 34, the dummy communicating port 39 is constituted by a first dummy communicating port 40 and a second dummy communicating port 41 and an inner dimension of the second dummy communicating port 41 is set to be smaller than an inner dimension of the first dummy communicating port 40.

Further, although according to the embodiment, the communicating port 34 and the dummy communicating port 39 opening shapes of which are constituted by small through holes in a rectangular shape are exemplified, the invention is not limited to the shape. For example, the shape may be constituted by a through hole opened in a circular shape or a through hole opened in a polygonal shape.

The escaping recess portion 35 forms an operating space of a compliance portion 46 (described later) in the common ink reservoir 14. According to the embodiment, the escaping recess portion 35 is constituted by a recess portion in a trapezoidal shape having a shape substantially the same as that of the recess 15 of the casing 2 and a depth equal to that of the elongated recess portion 33.

Next, the above-described elastic plate 32 will be explained. The elastic plate 32 is a kind of a sealing plate of the invention and is fabricated by, for example, a composite material having a two-layer structure laminating an elastic film 43 on a support plate 42. According to the embodiment, a stainless steel plate is used as the support plate 42 and PPS (polyphenylene sulphide) is used as the elastic film 43.

Figure 6:
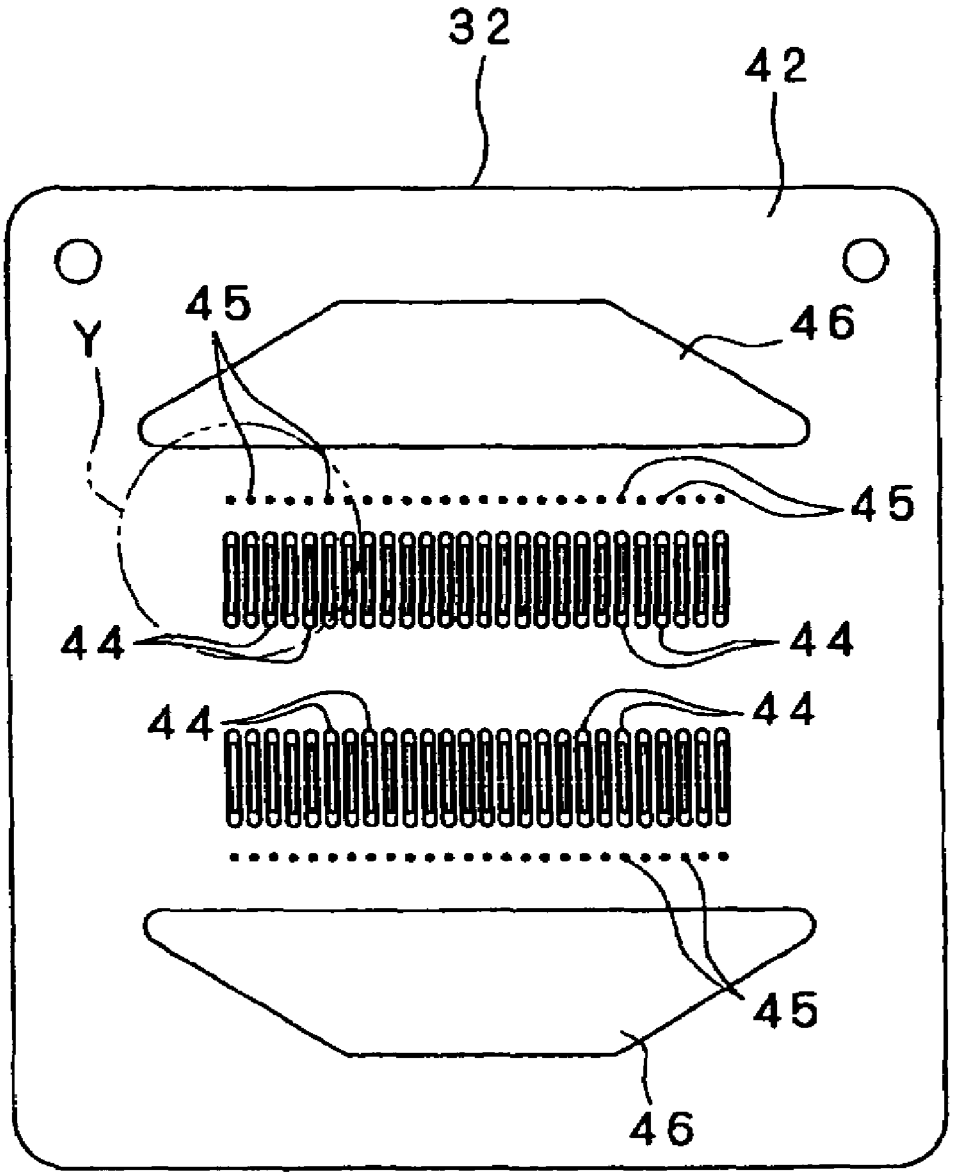
FIG. 6 is a plan view of an elastic plate.

As shown in FIG. 6, the elastic plate 32 is formed with a diaphragm portion 44, an ink supply port 45 and the compliance portion 46.

The diaphragm portion 44 is a portion for partitioning a portion of the pressure generating chamber 29. That is, the diaphragm portion 44 seals an opening face of the elongated recess portion 33 and forms to partition the pressure generating chamber 29 along with the elongated recess portion 33. As shown in FIG. 7A, the diaphragm portion 44 is of a slender shape in correspondence with the elongated recess portion 33 and is formed for each of the elongated recess portions 33 with respect to a sealing region for sealing the elongated recess portion 33. Specifically, a width of the diaphragm portion 44 is set to be substantially equal to the groove width of the elongated recess portion 33 and a length of the diaphragm portion 44 is set to be a slight shorter than the length of the elongated recess portion 33. With regard to the length, the length is set to be about two thirds of the length of the elongated recess portion 33. Further, with regard to a position of forming the diaphragm portion 44, as shown in FIG. 2, one end of the diaphragm portion 44 is aligned to one end of the elongated recess portion 33 (end portion on a side of the communicating port 34).

Figure 7B:
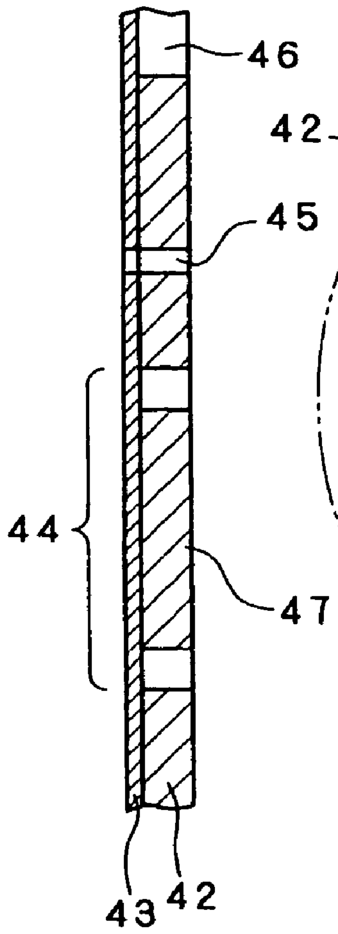
FIG. 7B is a sectional view taken along a line VIIB-VIIB of FIG. 7A.
Figure 7A:
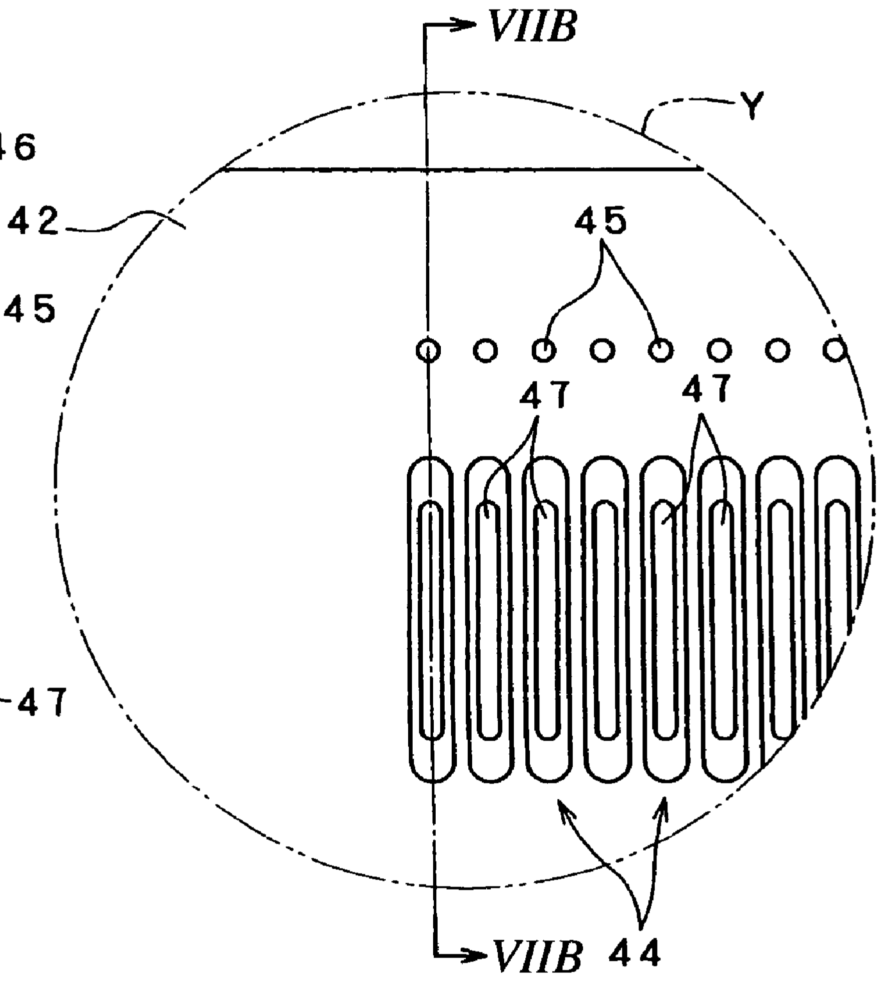
FIG. 7A is a view enlarging a Y portion of FIG. 6.

As shown in FIG. 7B, the diaphragm portion 44 is fabricated by removing the support plate 42 at a portion thereof in correspondence with the elongated recess portion 33 by etching or the like to constitute only the elastic film 43 and an island portion 47 is formed at inside of the ring. The island portion 47 is a portion bonded with a distal end face of the piezoelectric vibrator 10.

The ink supply port 45 is a hole for communicating the pressure generating chamber 29 and the common ink reservoir 14 and is penetrated in a plate thickness direction of the elastic plate 32. Similar to the diaphragm portion 44, also the ink supply port 45 is formed to each of the elongated recess portions 33 at a position in correspondence with the elongated recess portion 33. As shown in FIG. 2, the ink supply port 45 is bored at a position in correspondence with other end of the elongated recess portion 33 on a side opposed to the communicating port 34. Further, a diameter of the ink supply port 45 is set to be sufficiently smaller than the groove width of the elongated recess portion 33. According to the embodiment, the ink supply port 45 is constituted by a small through hole of 23 μm.

Reason of constituting the ink supply port 45 by the small through hole in this way is that flow path resistance is provided between the pressure generating chamber 29 and the common ink reservoir 14. That is, according to the recording head 1, an ink drop is ejected by utilizing a pressure variation applied to ink at inside of the pressure generating chamber 29. Therefore, in order to efficiently eject an ink drop, it is important that ink pressure at inside of the pressure generating chamber 29 is prevented from being escaped to a side of the common ink reservoir 14 as less as possible. From the view point, the ink supply port 45 is constituted by the small through hole.

Further, when the ink supply port 45 is constituted by the through hole as in the embodiment, there is an advantage that the working is facilitated and high dimensional accuracy is achieved. That is, the ink supply port 45 is the through hole, can be fabricated by laser machining. Therefore, even a small diameter can be fabricated with high dimensional accuracy and also the operation is facilitated.

The compliance portion 46 is a portion for partitioning a portion of the common ink reservoir 14. That is, the common ink reservoir 14 is formed to partition by the compliance portion 46 and the recess 15. The compliance portion 46 is of a trapezoidal shape substantially the same as an opening shape of the recess 15 and is fabricated by removing a portion of the support plate 42 by etching or the like to constitute only the elastic film 43.

Further, the support plate 42 and the elastic film 43 constituting the elastic plate 32 are not limited to the example. Further, polyimide may be used as the elastic film 43. Further, the elastic plate 32 may be constituted by a metal plate provided with a thick wall and a thin wall at a surrounding of the thick wall for constituting the diaphragm portion 44 and a thin wall for constituting the compliance portion 46.

Next, the above-described nozzle plate 31 will be explained. The nozzle plate 31 is a plate-shaped member made of a metal aligned with a plurality of nozzle orifices 48 at a pitch in correspondence with a dot forming density. According to the embodiment, a nozzle array is constituted by aligning a total of 180 pieces of the nozzle orifices 48 and two rows of the nozzles are formed as shown in FIG. 2.

Further, when the nozzle plate 31 is bonded to other face of the chamber formation plate 30, that is, to a surface thereof on a side opposed to the elastic plate 32, the respective nozzle orifices 48 face the corresponding communicating ports 34.

Further, when the above-described elastic plate 32 is bonded to one surface of the chamber formation plate 30, that is, a face thereof for forming the elongated recess portion 33, the diaphragm portion 44 seals the opening face of the elongated recess portion 33 to form to partition the pressure generating chamber 29. Similarly, also the opening face of the dummy recess portion 36 is sealed to form to partition the dummy pressure generating chamber. Further, when the above-described nozzle plate 31 is bonded to other surface of the chamber formation plate 30, the nozzle orifice 48 faces the corresponding communicating port 34. When the piezoelectric vibrator 10 bonded to the island portion 47 is extended or contracted under the state, the elastic film 43 at a surrounding of the island portion is deformed and the island portion 47 is pushed to the side of the elongated recess portion 33 or pulled in a direction of separating from the side of the elongated recess portion 33. By deforming the elastic film 43, the pressure generating chamber 29 is expanded or contracted to provide a pressure variation to ink at inside of the pressure generating chamber 29.

When the elastic plate 32 (that is, the flow path unit 4) is bonded to the casing 2, the compliance portion 46 seals the recess 15. The compliance portion 46 absorbs the pressure variation of ink stored in the common ink reservoir 14. That is, the elastic film 43 is deformed in accordance with pressure of stored ink. Further, the above-described escaping recess portion 35 forms a space for allowing the elastic film 43 to be expanded.

The recording head 1 having the above-described constitution includes a common ink flow path from the ink supply needle 19 to the common ink reservoir 14, and an individual ink flow path reaching each of the nozzle orifices 48 by passing the pressure generating chamber 29 from the common ink reservoir 14. Further, ink stored in the ink cartridge is introduced from the ink supply needle 19 and stored in the common ink reservoir 14 by passing the common ink flow path. Ink stored in the common ink reservoir 14 is ejected from the nozzle orifice 48 by passing the individual ink flow path.

For example, when the piezoelectric vibrator 10 is contracted, the diaphragm portion 44 is pulled to the side of the vibrator unit 3 to expand the pressure generating chamber 29. By the expansion, inside of the pressure generating chamber 29 is brought under negative pressure, ink at inside of the common ink reservoir 14 flows into each pressure generating chamber 29 by passing the ink supply port 45. Thereafter, when the piezoelectric vibrator 10 is extended, the diaphragm portion 44 is pushed to the side of the chamber formation plate 30 to contract the pressure generating chamber 29. By the contraction, ink pressure at inside of the pressure generating chamber 29 rises and an ink drop is ejected from the corresponding nozzle orifice 48.

According to the recording head 1, the bottom face of the pressure generating chamber 29 (elongated recess portion 33) is recessed in the V-shaped shape. Therefore, the wall thickness of the proximal portion of the partition wall 28 for partitioning the contiguous pressure generating chambers 29 is formed to be thicker than the wall thickness of the distal end portion. Thereby, the rigidity of the thick wall 28 can be increased. Therefore, in ejecting an ink drop, even when a variation of ink pressure is produced at inside of the pressure generating chamber 29, the pressure variation can be made to be difficult to transmit to the contiguous pressure generating chamber 29. As a result, the so-called contiguous cross talk can be prevented and ejection of ink drop can be stabilized.

According to the embodiment, the ink supply port 45 for communicating the common ink reservoir 14 and the pressure generating chamber 29 is constituted by the small hole penetrating the elastic plate 32 in the plate thickness direction, high dimensional accuracy thereof is easily achieved by laser machining or the like. Thereby, an ink flowing characteristic into the respective pressure generating chambers 29 (flowing velocity, flowing amount or the like) can be highly equalized. Further, when the fabrication is carried out by the laser beam, the fabrication is also facilitated.

According to the embodiment, there are provided the dummy pressure generating chambers which are not related to ejection of ink drop contiguously to the pressure generating chambers 29 at end portions of the array (that is, a hollow portion partitioned by the dummy recess portion 36 and the elastic plate 32), with regard to the pressure generating chambers 29 at both ends, one side thereof is formed with the contiguous pressure generating chamber 29 and an opposed thereof is formed with the dummy pressure generating chamber. Thereby, with regard to the pressure generating chambers 29 at end portions of the row, the rigidity of the partition wall partitioning the pressure generating chamber 29 can be made to be equal to the rigidity of the partition wall at the other pressure generating chambers 29 at a middle of the row. As a result, ink ejection characteristics of all the pressure generating chambers 29 of the one array can be made to be equal to each other.

With regard to the dummy pressure generating chamber, the width on the side of the aligning direction is made to be wider than the width of the respective pressure generating chambers 29. In other words, the width of the dummy recess portion 36 is made to be wider than the width of the elongated recess portion 33. Thereby, ejection characteristics of the pressure generating chamber 29 at the end portion of the array and the pressure generating chamber 29 at the middle of the array can be made to be equal to each other with high accuracy.

According to the embodiment, the recess 15 is formed by partially recessing the front end face of the casing 2, the common ink reservoir 14 is formed to partition by the recess 15 and the elastic plate 32, an exclusive member for forming the common ink reservoir 14 is dispensed with and simplification of the constitution is achieved. Further, the casing 2 is fabricated by resin dieing, fabrication of the recess 15 is also relatively facilitated.

Next, a method of manufacturing the recording head 1 will be explained. Since the manufacturing method is characterized in steps of manufacturing the chamber formation plate 30, an explanation will be mainly given for the steps of manufacturing the chamber formation plate 30.

The chamber formation plate 30 is fabricated by forging by a progressive die. Further, a metal plate 55 (referred to as "strip 55" in the following explanation) used as a material of the chamber formation plate 30 is made of nickel as described above.

The steps of manufacturing the chamber formation plate 30 comprises steps of forming the elongated recess portion 33 and steps of forming the communicating port 34 which are carried out by a progressive die.

Figure 8A:
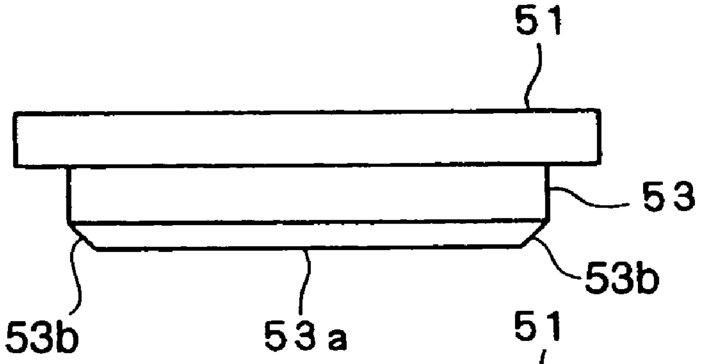
FIGS. 8A and 8B are views for explaining a first die used in forming an elongated recess portion.
Figure 8B:
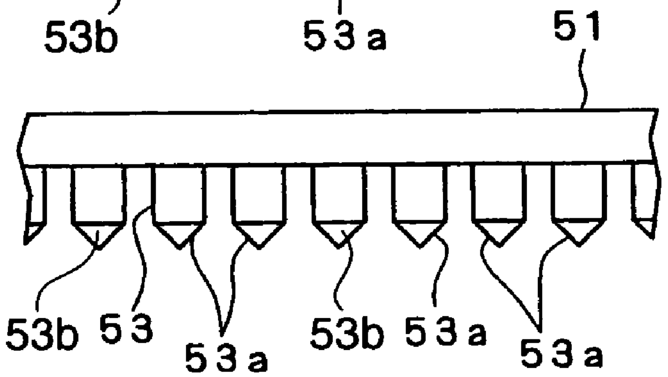
Figure 9A:
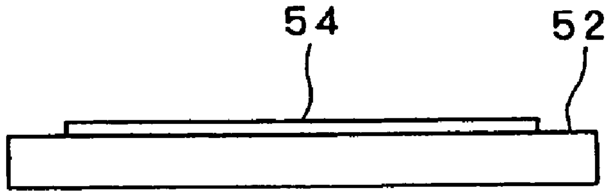
FIGS. 9A and 9B are views for explaining a second die used in forming the elongated recess portion.
Figure 9B:
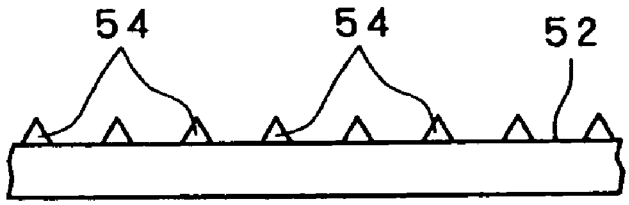

In the elongated recess portion forming steps, a first male die 51 shown in FIGS. 8A and 8B and a female die shown in FIGS. 9A and 9B are used. The first male die 51 is a die for forming the elongated recess portion 33. The male die is aligned with projections 53 for forming the elongated recess portions 33 by a number the same as that of the elongated recess portions 33. Further, the projections 53 at both ends in an aligned direction are also provided with dummy projections (not illustrated) for forming the dummy recess portions 36. A distal end portion 53*a* of the projection 53 is tapered from a center thereof in a width direction by an angle of about 45 degrees as shown in FIG. 8B. Thereby, the distal end portion 53*a* is sharpened in the V-shaped shape in view from a longitudinal direction thereof. Further, both longitudinal ends 53*b* of the distal end portions 53*a* are tapered by an angle of about 45 degrees as shown in FIG. 8A. Therefore, the distal end portion 53*a* of the projection. 53 is formed in a shape of tapering both ends of a triangular prism.

Figure 10A:
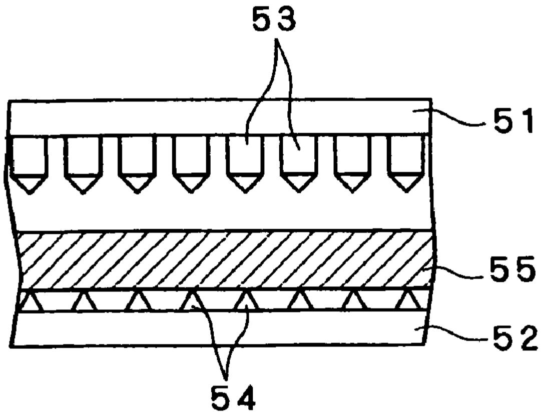
FIGS. 10A to 10C are views for explaining steps of forming the elongated recess portion.

Further, the female die 52 is formed with a plurality of projections 54 at an upper face thereof. The projection 54 is for assisting to form the partition wall partitioning the contiguous pressure generating chambers 29 and is disposed between the elongated recess portions 33. As shown in FIG. 10A, the projections 54 extend parallel with the longitudinal direction of the projections 53 and are located at such positions as to be opposed to the corresponding projections 53. As shown in FIGS. 9B and 10A, each projection 54 has a wedge-shaped cross section and its sharpened portion is opposed to the distal end portion 53*a* of the corresponding projection 53. The length of the projections 54 is set approximately the same as that of the elongated recess portions 33 (projections 53).

Figure 10B:
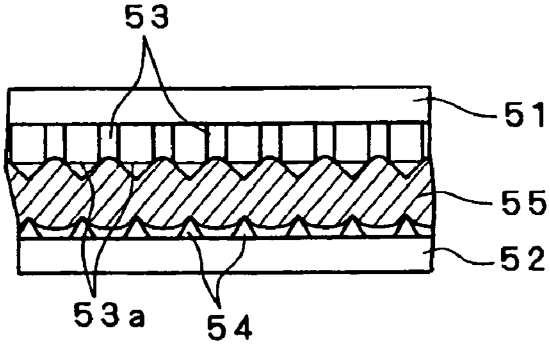
Figure 10C:
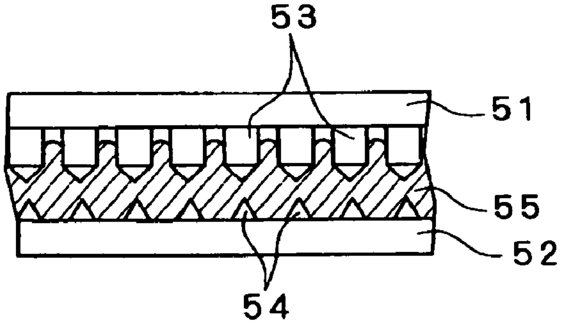

In the elongated recess portion forming steps, first, as shown in FIG. 10A, the strip 55 is mounted at an upper face of the female die 52 and the first male die 51 is arranged on an upper side of the strip 55. Next, as shown in FIG. 10B, the first male die 51 is moved down to push the distal end portion of the projection 53 into the strip 55. At this occasion, since the distal end portion 53*a* of the projection 53 is sharpened in the V-shaped shape, the distal end portion 53*a* can firmly be pushed into the strip 55 without buckling. Pushing of the projection 53 is carried out up to a middle in a plate thickness direction of the strip 55 as shown in FIG. 10C.

By pushing the projection 53, a portion of the strip 55 flows to form the elongated recess portion 33. In this case, since the distal end portion 53*a* of the projection 53 is sharpened in the V-shaped shape, even the elongated recess portion 33 having a small shape can be formed with high dimensional accuracy. That is, the portion of the strip 55 pushed by the distal end portion 53*a* flows smoothly, the elongated recess portion 33 to be formed is formed in a shape following the shape of the projection 53. Further, since the both longitudinal ends 53*b* of the distal end portion 53*a* are tapered, the strip 55 pushed by the portions also flows smoothly. Therefore, also the both end portions in the longitudinal direction of the elongated recess portion 33 are formed with high dimensional accuracy.

As the distal end portions 53*a* are dug into the strip 55 in the above manner, the metal material is pressed between the distal end portions 53*a* and the projections 54 opposed to the distal end portions 53*a* and thereby flows into the gaps between the projections 53.

Since pushing of the projection 53 is stopped at the middle of the plate thickness direction, the strip 55 thicker than in the case of forming a through hole can be used. Thereby, the rigidity of the chamber formation plate 30 can be increased and improvement of an ink ejection characteristic is achieved. Further, the chamber formation plate 30 is easily dealt with and the operation is advantageous also in enhancing plane accuracy.

A portion of the strip 55 is raised into a space between the contiguous projections 53 by being pressed by the projections 53. In this case, the projection 54 provided at the female die 52 is arranged at a position in correspondence with an interval between the projections 53, flow of the strip 55 into the space is assisted. Thereby, the strip 55 can efficiently be introduced into the space between the projections 53 and the protrusion (i.e., the partition wall 28) can be formed highly.

Next, a description will be made of how the strip 55 is deformed when a large number of recessed portions are formed in the strip 55.

Figure 10D:
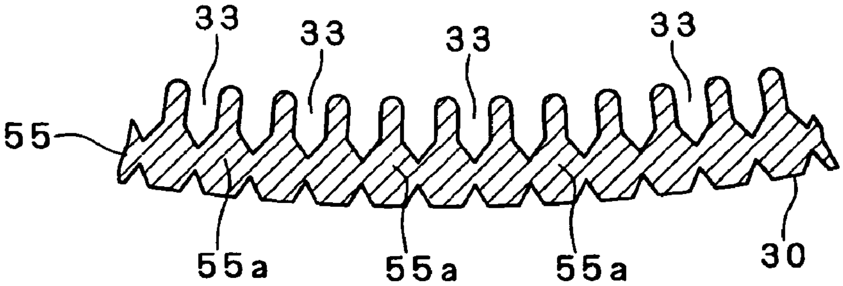
FIG. 10D is a section view showing a metal plate warped by the formation of the elongated recess portion.

FIG. 10C shows a state that the first male die 51 has been advanced fully (maximum stroke). In this state, the strip 55 is confined completely between the first male die 51 and the female die 52. When the first male die 51 is returned to the original position from this state, the strip 55 is released. At this time, as shown in FIG. 10D, due to the internal stress of the strip 55, the strip 55 is deformed so as to assume a smooth curve in which a center portion is low and end portions are high. The reason why the strip 55 is warped in this manner is considered due to combined occurrence of a phenomenon that thick portions 55*a* of the strip 55 expand in the arrayed direction of the elongated recess portions 33 due to the internal stress and a phenomenon that the elongated recess portions 33 above the thick portions 55*a* are gaps and hence cannot suppress their expansion in the arrayed direction.

In other words, as described above, if the strip 55 is placed generally horizontally with the openings of the elongated recess portions 33 located above and the bottoms of the elongated recess portions 33 located below, the warped shape is such that the ends in the arrayed direction of the elongated recess portions 33 are highest and the height decreases gradually as the position goes from the ends to the center.

After the elongated recess portions 33 have been formed in the above-described manner, a transition is made to the communicating ports forming process to form minute communicating ports 34 in the bottom portions of the elongated recess portions 33.

As shown in FIGS. 11A and 11B, according to a first embodiment of the invention, a second male die 57 and a third male die 59 are used in the communicating ports forming process. The second male die 57 is configured such that plural rectangular-prism-shaped first punches 56 that conform in shape to intended first communicating ports 37 are arrayed on a base member at a prescribed pitch. The third male die 59 is configured such that plural rectangular-prism-shaped second punches 58 that conform in shape to intended second communicating ports 38 are arrayed on a base member at a prescribed pitch. The second punches 58 are one size narrower than the first punches 56.

Since the bottom portions of the elongated recess portions 33 are gently slant as shown in FIG. 10D, the center line O2 of each of the end elongated recess portions 33 is inclined from the digging direction line O1 of the first punches 56 by an angle θ as shown in FIG. 11D. If the distal end faces 56*f* of the first punches 56 are perpendicular to the digging direction line O1 and the first punches 56 are dug along the digging direction line O1 in this condition, the only one side of each distal end face 56*f* is pressed against the one slant surface of the V-shaped bottom portion of the associated elongated recess portion 33. Hence, bending force represented by arrow P1 acts on the first punch 56. The bending force P1 acts in the direction from the end of the first punch array 56*a* to its center. Therefore, bending stress is concentrated at the proximal end of each first punch 56.

Because of the above bending force P1, the position of digging of each first punch 56 into the bottom portion of the associated elongated recess portion 33 is deviated rightward in FIG. 11D, as a result of which the accuracy of the positions of formation of the first communicating ports 37 is lowered. This phenomenon is remarkable at locations where the angle θ is large, that is, the phenomenon becomes more remarkable as the position goes closer to the ends of the array of elongated recess portions 33. Conversely, the phenomenon is negligible around the center of the first punch array 56*a*. That is, since the angle θ is large at and near the end elongated recess portions 33, the problem of the deviation of the punch digging position is serious there. As the position goes closer to the center of the array of elongated recess portions 33, the angle θ decreases gradually and hence the bending force P1 also decreases gradually. The deviation of the punch digging position occurs in either of a case that the first punches 56 are deformed elastically and a case that they are deformed plastically. In either case, the accuracy of the positions of formation of the first communicating ports 37 is lowered. Since this phenomenon is most remarkable at and near the ends of the first punch array 56*a*, the first punches 56 are prone to wear there, which lowers the durability of the tool.

To solve the above problem, in this embodiment, the distal end faces of first punches 56 at and near the ends of the first punch array 56*a* are shaped into slant faces 56*g* as shown in FIG. 11E. More specifically, the slant faces 56*g* are configured such that the position thereof recedes more in the punch digging direction as the position goes closer to the center of the first punch array 56*a*. As shown in FIG. 11F, a contour line 56*b* formed by the slant faces 56*g* of the first punches 56 at and near the ends of the first punch array 56*a* is inclined so that the slant distal end face 56*g* projects more in the advancement direction of the second male die 57 as the position goes closer to the ends of the first punch array 56*a*. A dashed chain line in FIG. 11 F indicates an imaginary plane S that is perpendicular to the punch (male die) digging direction. The interval between the imaginary plane S and the slant distal end face 56*g* increases as the position goes closer to the center of the first punch array 56*a* (goes rightward in FIG. 11F). Reference numeral 56*b* represents a contour line formed by connecting the distal end faces 56*g* of the first punches 56. In this case, as shown in FIG. 11I, the contour line 56*b* is defined by two slant straight lines 56*c* connected by a horizontal straight line 56*d* located therebetween. In this diagram, the first punches 56 and the elongated recess portions 33 formed in the strip 55 in advance are drawn simply as fine short lines.

As shown in FIG. 11G, because of the formation of the slant distal end face 56*g*, the one edge of the tip portion of each first punch 56 is shaped into an acute angle portion 56*h*. When the acute angle portion 56*h* hits the slant surface of the bottom portion of the corresponding elongated recess portion 33, bending force P1 of the same kind as described above is generated. At the same time, bending force P2 that counters the bending force P1 is generated because the acute angle portion 56*h* digs into the bottom portion of the elongated recess portion 33. The bending force P2 cancels out the bending force P1 entirely or partially, and hence the total bending force of moving the first punch 56 toward the center of the first punch array 56*a* is canceled or is weakened. It is considered that the bending force P2 originates from reaction force that the slant distal end face 56*g* that has cut into the strip 55 receives from the strip 55.

The first punches 56 shown in FIG. 11F have the same pitch as the arrayed pitch of the elongated recess portions 33, and are dug into the bottom portions of the corresponding elongated recess portions 33 at the prescribed positions as the second male die 57 is advanced. As described above, the contour line 56*b* formed by the slant faces 56*g* of the first punches 56 at and near the ends of the first punch array 56*a* is inclined so that the slant distal end face 56*g* projects more in the advancement direction of the second male die 57 as the position goes closer to the ends of the first punch array 56*a*.

According to this rule, the shape of the contour line 56*b* may be modified in various manners described below. For example, the contour line 56*b* may assume a smooth curve (circular arc).

The slant straight parts 56*c* of the contour line 56*b* shown in FIG. 11I may be curved. As shown in FIG. 11J, the center horizontal part 56*d* of the contour line 56*b* may be projected toward the strip 55. As shown in FIG. 11K, the slant straight parts 56*c* of the contour line 56*b* shown in FIG. 11J may be provided as curved slant parts 56*i*. As shown in FIG. 11L, the contour line 56*b* may be formed only with slant straight parts 56*c*.

The lengths of the first punches 56 are set according to the shape of the contour line 56*b*. That is, the length of the first punches 56 at and near the ends of the first punch array 56*a* increases as the position goes closer to the ends, and the first punches 56 at and near the ends of the first punch array 56*a* are longer than the central first punches 56, in the examples of FIGS. 11H, 11I and 11K. Alternatively, the length of the first punches 56 at and near the ends of the first punch array 56*a* increases as the position goes closer to the ends, and the central first punches 56 project in the punch digging direction, in the examples of FIGS. 11J and 11K.

Further, the above-described bending force P2 may be obtained even in a case where the lengths of the first punches 56 are determined such that the lowermost positions of the respective slant faces 56*g* are arranged on the imaginary plane S.

In order to form the communicating ports 34, as shown in FIG. 11A, unpierced recesses as first communicating ports 37 are first formed by digging the first punches 56 of the second male die 57 into the bottom portions of the elongated recess portions 33 of the strip 55 halfway in the thickness direction. Incidentally, as shown in FIG. 11G, the bending forces P1 and P2 counter each other, whereby the bending of the first punches 56 and the deviation of the punch digging positions can be prevented.

Since as described above the bending forces P1 and P2 counter each other and the bending of the first punches 56 and the deviation of the punch digging positions can thereby be prevented, communicating ports 34 can be formed correctly at the prescribed positions. In addition, since the total force of bending each first punch 56 is canceled or weakened greatly because the bending forces P1 and P2 counter each other, the durability of the first punches 56 is increased.

As shown in FIG. 11B, in the second punches 58 of the third male die 59, a second punch array 58*a* and a contour line 58*b* (a line connecting the distal end faces of the second punches 58) are formed in the same manner as in the first punches 56. The shape of the contour line 58*b* and the lengths of the second punches 58 are set in the same manners as the shape of the contour line 56*b* and the lengths of the first punches 56. After the recesses as the first communicating ports 37 have been formed in the above-described manner, as shown in FIG. 11B the second punches 58 of the third male die 59 are dug into the bottom portions of the first communicating ports 37 from the side of the elongated recess portions

33, whereby unpierced recesses as second communicating ports 38 are formed. Incidentally, the back surface of the strip 55 is formed with bulges 38*a*.

Then, the bulges 38*a* are ground away to an imaginary plane 30*a* indicated by a dashed chain line in FIG. 11B, whereby the second communicating ports 38 are given openings on the back surface side of the strip 55.

The advantages of the above working method according to the first embodiment are as follows.

For example, when an array of elongated recess portions 33 is formed in a strip 55 at a prescribed pitch, there may occur, for a certain reason, an event that internal stresses etc. occurring at local forming positions of the strip 55 are accumulated in the arrayed direction. As a result, the strip 55 may be warped. However, in the working method of this embodiment, since the distal end faces of at least first punches 56 at and near the ends of the first punch array 56*a* are shaped into the slant faces 56*g* in which the lowermost position recedes more in the punch digging direction as the position goes closer to the center of the first punch array 56*a*, bending force P2 is generated because of the warp of the strip 55 so as to counter bending force P1 that is directed toward the center of the first punch array 56*a* when the bending force P1 acts on each of the first punches 56 at and near the ends of the first punch array 56*a*. Since the bending force P2 generated by the slant distal end face 56*g* cancels out the bending force P1 entirely or in a large part, the total bending force acting on each first punch 56 can be weakened to a negligible level. As a result, no inclinations etc. occur in the first punches 56 at and near the ends of the first punch array 56*a*, and hence an array of communicating ports 34 can be formed in the bottom portions of the elongated recess portions 33 correctly at the prescribed positions.

Therefore, reduction in working accuracy due to the abnormal arrangement form can be prevented and high quality can be attained in accuracy. In addition, since the bending loads on the first punches 56 at and near the ends are reduced, an event that punches at particular positions are bent or broken does not occur and hence the durability of the punching tool can be increased. The above advantages are particularly effective in forming an array of communicating ports 34 in a liquid ejecting head, for example.

An array of elongated recess portions 33 is formed at a prescribed pitch in a strip 55 and the first punches 56 having the same pitch as the elongated recess portions 33 are dug into the bottom portions of the elongated recess portions 33. Therefore, communicating ports 34 can be formed correctly relatively to the prescribed positions of densely arranged elongated recess portions 33 even if they are located at and near the ends of the array.

The contour line 56*b* of first punches 56 at and near the ends of the first punch array 56*a* is inclined so that the slant distal end face 56*g* projects more in the advancement direction of the second male die 57 as the position goes closer to the ends. Therefore, the first punches 56 at and near the ends of the first punch array 56*a* can be caused to perform initial-stage working with high accuracy as the second male die 57 is advanced. Even if bending force P1 toward the center of the first punch array 56*a* acts on each of the first punches 56 at and near the ends of the first punch array 56*a* as the second male die 57 is advanced or the first punches 56 at and near the ends of the first punch array 56*a* are involved in working for a longer time and receive heavier working loads because they are first dug into the bottom portions of the corresponding elongated recess portions 33, the communicating ports 34 can be formed correctly at the prescribed positions of the elongated recess portions 33 because the total bending force acting on each of the first punches 56 at and near the ends of the first punch array 56*a* is weakened by the slant distal end face 56*g*. An event that only the first punches 56 at and near the ends of the first punch array 56*a* wear early does not occur, and the durability of the punching tool can be increased.

The contour line 56*b* of the first punch array 56*a* projects more in the advancement direction of the second male die 57 in end portions of the first punch array 56*a* than in its central portion. Therefore, even if the strip 55 is warped as mentioned the above, the first punches 56 in the end portions of the first punch array 56*a* start working earlier than the first punches 56 in the central portion and then the entire first punch array 56*a* performs working, whereby the communicating ports 34 can be formed correctly at the prescribed positions of the elongated recess portions 33.

In a case where the contour line 56*b* is configured as shown in FIG. 11I, after the first punches 56 at the ends of the first punch array 56*a* have started working, the first punches 56 that start working move toward the center of the first punch array 56*a* gradually according to the gradient of the straight portions 56*c*. Therefore, the working loads on the first punches 56 at and near the ends of the first punch array 56*a* can be set according to the durability of the first punches 56 and the working depth by setting the gradient (i.e., angle) of the straight parts 56*c* at a proper value, which is effective in increasing the durability of the punching tool.

Figure 11H:
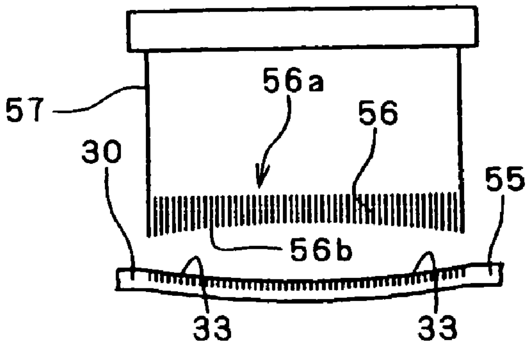
FIG. 11H is a side view of a first modified example of the first punch of the second male die of FIG. 11A.
Figure 11I:
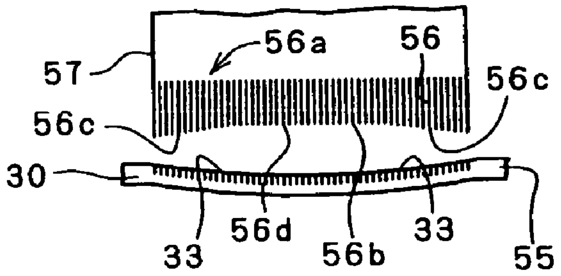
FIG. 11I is a side view of the first punch of the second male die of FIG. 11A.
Figure 11J:
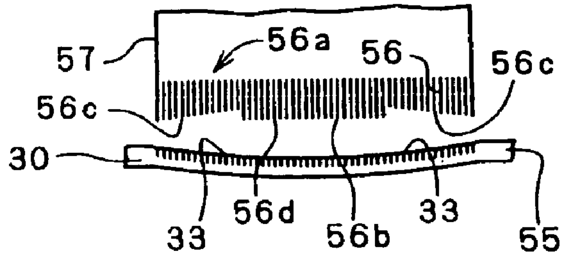
FIG. 11J is a side view of a second modified example of the first punch of the second male die of FIG. 11A.
Figure 11K:
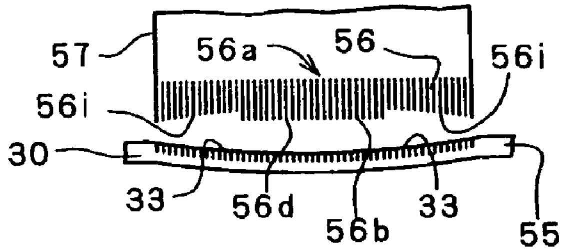
FIG. 11K is a side view of a third modified example of the first punch of the second male die of FIG. 11A.
Figure 11L:
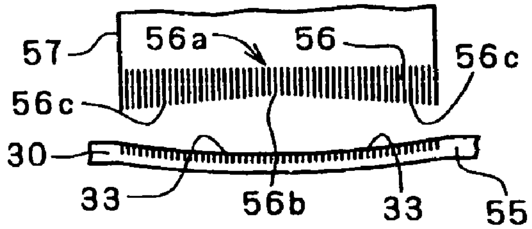
FIG. 11L is a side view of a fourth modified example of the first punch of the second male die of FIG. 11A.
Figure 11M:
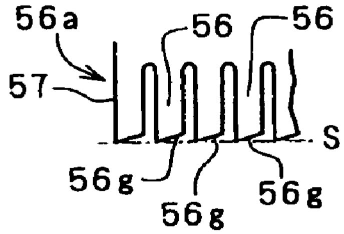
FIG. 11M is a side view of a fifth modified example of the first punch of the second male die of FIG. 11A.

In a case where the contour line 56*b* is configured as shown in FIG. 11H, the first punches 56 at and near the ends of the first punch array 56*a* first performs hole formation working correctly and then a transition is made continuously and gradually to hole formation working by the central first punches 56. As a result, the working can be performed continuously and smoothly, which is effective in increasing the durability of the first punches 56.

In a case where the contour line 56*b* is configured as shown in FIG. 11J, after the first punches 56 at the ends of the first punch array 56*a* have started working, the first punches 56 that start working move toward the center of the first punch array 56*a* gradually according to the gradient of the straight parts 56*c*. Therefore, the working loads on the first punches 56 at and near the ends of the first punch array 56*a* can be set according to the durability of the first punches 56 and the working depth by setting the gradient (i.e., angle) of the straight parts 56*c* at a proper value. In addition, since the horizontal straight part 56*d* start working after the slant straight parts 56*c*, the entire first punch array 56*a* can perform working smoothly.

In a case where the contour line 56*b* is configured as shown in FIG. 11K, after the first punches 56 at the ends of the first punch array 56*a* have started working, the first punches 56 that start working move toward the center of the first punch array 56*a* gradually in accordance with the curved slant parts 56*i*. Therefore, the working loads on the first punches 56 at and near the ends of the first punch array 56*a* can be set according to the durability of the first punches 56 and the working depth by suitably setting the curvature of the curved slant parts 56*i*. In addition, since the horizontal straight part 56*d* start working after the curved slant parts 56*i*, the entire first punch array 56*a* can perform working smoothly.

The lengths of the first punches 56 at and near the ends of the first punch array 56*a* are set in such a manner that the length increases as the position goes closer to the ends of the first punch array 56*a*. Therefore, even if bending force P1 toward the center of the first punch array 56*a* acts on each of the first punches 56 at and near the ends of the first punch array 56*a* as the second male die 57 is advanced or the first punches 56 at and near the ends of the first punch array 56*a* are involved in working for a longer time and receive heavier working loads because they are first dug into the strip 55, the communicating ports 34 can be formed correctly at the prescribed positions of the strip 55 because the total bending force acting on each of the first punches 56 at and near the ends of the first punch array 56*a* is weakened by the slant distal end face 56*g*. An event that only the first punches 56 at and near the ends of the first punch array 56*a* wear early does not occur, and the durability of the punching tool can be increased.

The lengths of the first punches 56 at and near the ends of the first punch array 56*a* are set longer than the lengths of the central first punches 56. Therefore, even if the strip 55 is warped as mentioned the above, the first punches 56 in the end portions of the first punch array 56*a* start working earlier than the first punches 56 in the central portion and then the entire first punch array 56*a* performs working, whereby the communicating ports 34 can be formed in the bottom portions of the elongated recess portions 33 correctly at the prescribed positions.

The lengths of the first punches 56 at and near the ends of the first punch array 56*a* are set in such a manner that the length increases as the position goes closer to the ends of the first punch array 56*a*, and the lengths of the first punches 56 are set in such a manner that the central first punches 56 project more in the punch digging direction than the other first punches 56. Therefore, even if bending force P1 toward the center of the first punch array 56*a* acts on each of the first punches 56 at and near the ends of the first punch array 56*a* as the second male die 57 is advanced or the first punches 56 at and near the ends of the first punch array 56*a* are involved in working for a longer time and receive heavier working loads because they are first dug into the strip 55, the communicating ports 34 can be formed in the bottom portions of the elongated recess portions 33 correctly at the prescribed positions because the total bending force acting on each of the first punches 56 at and near the ends of the first punch array 56*a* is weakened by the slant distal end face 56*g*. An event that only the first punches 56 at and near the ends of the first punch array 56*a* wear early does not occur, and the durability of the punching tool can be increased. In addition, since the lengths of the first punches 56 are set in such a manner that the central first punches 56 project more in the punch digging direction than the other first punches 56, the central first punches 56 start working almost immediately after the end of working by the first punches 56 at and near the ends of the first punch array 56*a*, which enables working that is free of unevenness over the entire first punch array 56*a*.

Even if the first punches 56 have a rectangular cross section with which prescribed shape accuracy is hard to attain, rectangular communicating ports 34 can be obtained with high shape accuracy because the first punches 56 at and near the ends of the first punch array 56*a* perform high-precision working at the initial working stage.

The process for forming the communicating ports 34 includes the first process for forming unpierced recesses 37 in the strip 55 using the first punches 56, the second process for forming unpierced recesses 38 while causing the bottom portions of the recesses 37 to bulge using the second punches 58, and the third process for removing bulges 38a. Since the workings with the punches 56 and 58 at and near the ends of the punch arrays 56*a* and 58*a* are performed first with high accuracy, the recesses 37 or 38 are formed correctly in the first or second process and the bulging lengths of the bulges 38*a* are made almost uniform. Therefore, the thicknesses of the portions that are removed in the third step are constant among the recesses 38, whereby the removing process is simplified and the lengths of resulting communicating ports 34 are made uniform.

Since the above recessed portions are elongated recess portions 33, a procedure is possible that hole formation working by the first punches 56 at and near the ends of the first punch array 56*a* is performed first with high accuracy on the elongated recess portions 33 and subsequently the arrayed communicating ports 34 are formed correctly at the prescribed positions of the elongated recess portions 33 at the same pitch as the pitch of the elongated recess portions 33.

The elongated recess portions 33 have V-shaped bottom portions. When the communicating ports 34 are formed in the V-shaped bottom portions of the elongated recess portions 33 under a condition that the strip 55 is warped, the first punches 56 are prone to be bent or escape due to the V-shaped slant surfaces, resulting in reduction in working accuracy. However, this problem relating to the working accuracy can be solved because correct hole formation working is performed in advance at the prescribed positions on V-shaped slant surfaces having abnormal inclination angles in the elongated recess portions 33 corresponding to the first punches 56 at and near the ends of the first punch array 56*a*.

Next, a second embodiment of the invention will be described. Components similar to those in the first embodiment will be designated by the same reference numerals and repetitive explanations for those will be omitted.

Figure 11N:
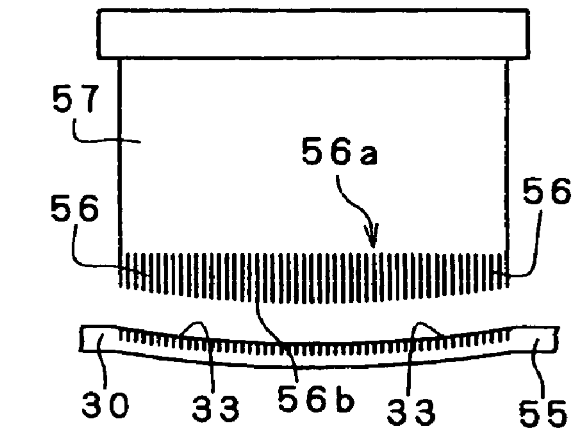
FIG. 11N is a side view of a first punch of a second male die according to a second embodiment of the invention.

In this embodiment, as shown in FIG. 11N, distal end faces of a first punch array 56*a* of first punches 56 are made slant such that a contour line 56*b* generally assumes a circular arc shape that is approximately the same as the warped shape of the strip 55.

With this configuration, when the communicating ports 34 are formed, the distal end faces of the first punches 56, is dug into the bottom portions of the elongated recess portions 33 almost simultaneously.

Therefore, the working loads imposed on the respective first punches 56 are made uniform and hence there does not occur an event that a particular portion of the contour line 56*b* wears early. In addition, since the digging depths at the respective working positions are uniform, the working accuracy can be increased.

In the second punches 58 of the third male die 59, a second punch array 58*a* is formed and a contour line 58*b* can be defined in the same manner as in the first punches 56. The contour line 58*b* generally assumes a circular arc shape that is approximately the same as the warped shape of the strip 55.

Figure 11O:
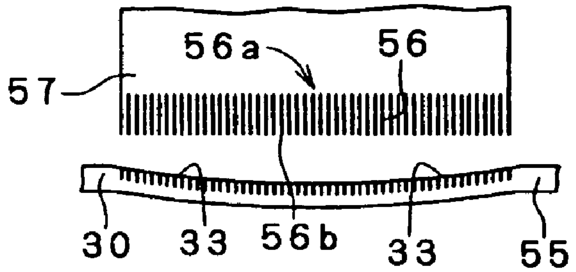
FIG. 11O is a side view of a comparative example for the second male die of FIG. 11N.

FIG. 11O shows a comparative example in which the contour line 56*b* assumes a horizontal straight line. In this case, first punches 56 at and near the ends of the contour line 56*b* are first dug into the bottom portions of the corresponding elongated recess portions 33 and the digging positions shift in order toward the center of the array of elongated recess portions 33. Therefore, the time in which the first punches 56 at and near the ends of the contour line 56*b* serve to deform the material is long, as a result of which they receive heavy working loads and wear early.

Although it is most desirable that the contour line 56*b* is the same as the warped shape of the strip 55 in their arrayed direction of the elongated recess portions 33 as shown in FIG. 11N, the problems can be solved as long as they approximate each other.

Figure 11P:
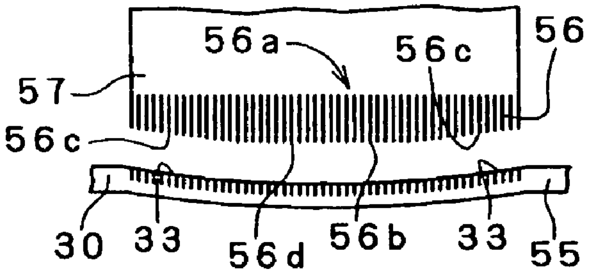
FIG. 11P is a side view of a first modified example of the first punch of the second male die of FIG. 11N.

For example, as shown in FIG. 11P as a first modified example, the contour line 56*b* may have slant straight parts 56*c* connected by a horizontal straight part 56*d* located therebetween.

Figure 11Q:
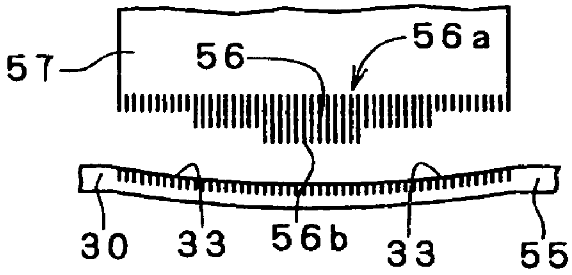
FIG. 11Q is a side view of a second modified example of the first punch of the second male die of FIG. 11N.

As shown in FIG. 11Q as a second modified example, the contour line 56*b* may be projected stepwise toward the strip 55 as being closer to the center thereof.

Figure 11R:
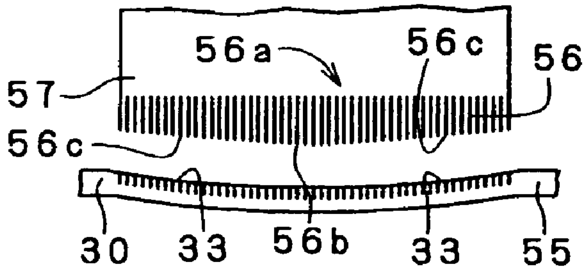
FIG. 11R is a side view of a third modified example of the first punch of the second male die of FIG. 11N.

As shown in FIG. 11R as a third modified example, the contour line 56*b* may be formed only with slant straight parts 56*c*.

The advantages of the above working method according to the second embodiment are as follows.

For example, when an array of elongated recess portions 33 is formed in a strip 55 at a prescribed pitch, there may occur, for a certain reason, an event that internal stresses etc. occurring at local forming positions of the strip 55 are accumulated in the arrayed direction. As a result, the strip 55 may be warped. However, according to the working method of this embodiment, the punches 56 or 58 of the punch array 56*a* or 58*a* are dug into the bottom portions of the elongated recess portions 33 almost simultaneously. Therefore, the working shapes of the respective elongated recess portions 33 are made uniform; that is, reduction in working accuracy due to the warp of the strip 55 can be prevented and high quality can be attained in accuracy. Further, since no unevenness occurs in the working loads on the respective punches 56 or 58, there does not occur an event that punches at particular positions are bent or broken. The durability of the punches 56 or 58 can thus be increased. The above advantages are particularly effective in forming an array of minute holes in a liquid ejecting head, for example.

The contour line 56*b* or 58*b* of the punch array 56*a* or 58*a* is configured such that the distal end faces of the central punches 56 or 58 project more in the advancement direction of the male die 57 or 59 than those of the punches 56 or 58 at and near the ends of the punch array 56*a* or 58*a*. Therefore, even if the strip 55 is warped by the formation of the elongated recess portions 33, the punches 56 or 58 can be dug into the bottom portions of the elongated recess portions 33 almost simultaneously by making the shape of the contour line 56*b* or 58*b* identical or approximately identical to the warped shape of the strip 55.

In a case where the contour line 56*b* or 58*b* is configured as shown in FIG. 11N, since the shape of the contour line 56*b* or 58*b* can be made the same as the warped shape of the strip 55, the punches 56 or 58 can be dug into the bottom portions of the elongated recess portions 33 simultaneously.

In a case where the contour line 56*b* or 58*b* is configured as shown in FIGS. 11P and 11R, since the shape of the contour line 56*b* or 58*b* can be made approximately the same as the warped shape of the strip 55, the punches 56 or 58 can thus be dug into the bottom portions of the elongated recess portions 33 almost simultaneously.

A mass-production-level durability test showed that the contour line 56*b* or 58*b* of FIG. 11P provides about five times higher durability than other contour lines.

In a case where the contour line 56*b* or 58*b* is configured as shown in FIG. 11R, since the shape of the contour line 56*b* or 58*b* can be made approximately the same as the warped shape of the strip 55, the punches 56 or 58 can thus be dug into the bottom portions of the elongated recess portions 33 almost simultaneously.

The punches 56 or 58 at and near the ends of the first punch array 56*a* or 58*a* are set shorter than the central punches 56 or 58. Therefore, even if the working loads on the punches 56 or 58 at and near the ends of the first punch array 56*a* or 58*a* are heavy, an event can be prevented that the durability of those punches 56 or 58 becomes lower than that of the central punches 56 or 58.

Since the punches 56 or 58 having a rectangular cross section are dug into the bottom portions of the elongated recess portions 33 almost simultaneously, rectangular minute holes can be formed with high shape accuracy.

Communication holes 34 are formed by the process including the first process for forming unpierced recesses in a strip 55 using the first punches 56, the second process for forming unpierced recesses while causing the bottom portions of the recesses to bulge using the second punches 58, and the third process for removing bulges 38*a* by grinding. Since the punches 56 or 58 are dug into the bottom portions of the elongated recess portions 33 almost simultaneously and the digging lengths of the respective punches 56 or 58 are almost uniform, the recesses formed in the first and second processes are given correct shapes and the bulging lengths of the bulges 38*a* are made almost uniform. Therefore, the grinding lengths of the grinding in the third step are constant among the recesses, whereby the third process is simplified and the lengths of resulting minute holes are made uniform.

The elongated recess portions 33 have V-shaped bottom portions. When communicating ports 34 are formed in the V-shaped bottom portions of the elongated recess portions 33, if the strip 55 is warped by the formation of the elongated recess portions 33, first punches 56 for forming first communicating ports 37 are prone to be bent or escape due to the V-shaped slant surfaces, resulting in reduction in working accuracy. However, this problem relating to the working accuracy can be solved by making the first punches 56 to be dug almost simultaneously in view of the warped shape of the strip 55.

In the tool that is used for the working for formation of minute holes, the first punch array 56*a* or 58*a* is formed by providing, at the prescribed pitch, the punches 56 or 58 as tip portions of the male die 57 or 59 and the contour line 56*b* or 58*b* of the first punch array 56*a* or 58*a* is configured such that the distal end faces of the central punches 56 or 58 project more in the advancement direction of the male die 57 or 59 than those of the punches 56 or 58 at and near the ends of the first punch array 56*a* or 58*a*.

Therefore, even if the strip 55 is warped by the formation of the elongated recess portions 33, the punches 56 or 58 can be dug into the bottom portions of the elongated recess portions 33 almost simultaneously by making the shape of the contour line 56*b* or 58*b* identical or approximately identical to the warped shape. Further, since the working loads on the respective punches 56 or 58 are almost uniform, there does not occur an event that punches 56 or 58 at particular positions are damaged early. The life of the expensive tool can thus be elongated, which is economical.

Figure 12A:
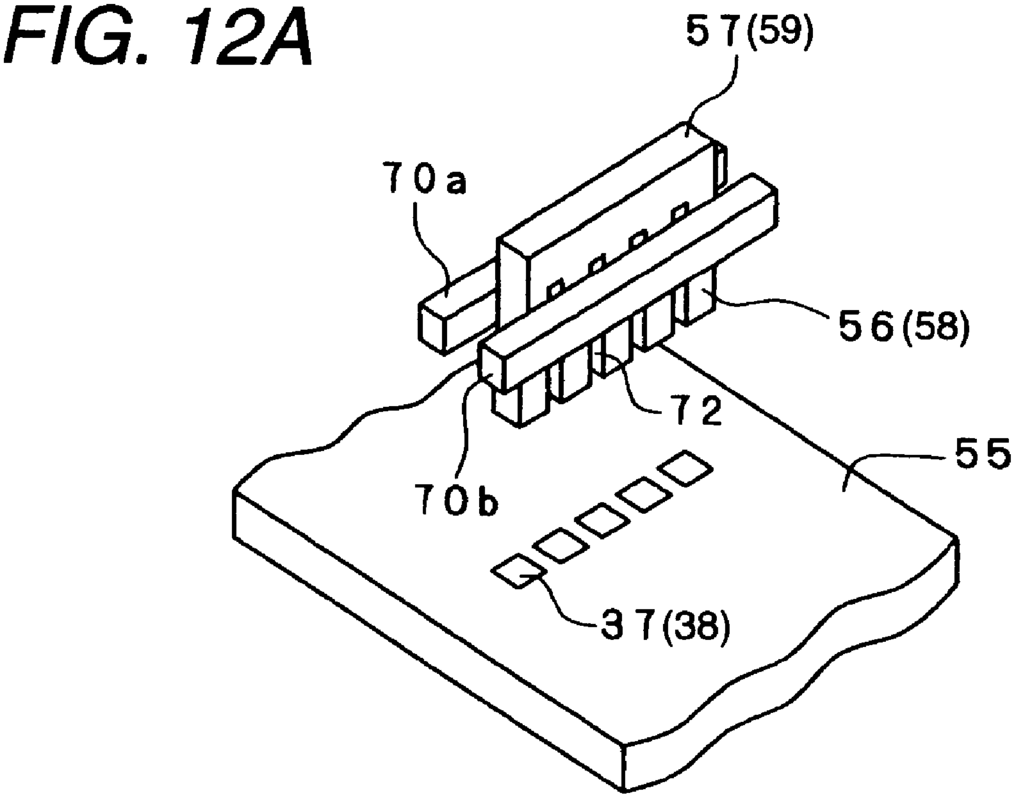
FIG. 12A is a perspective view showing a state that the first punch or the second punch is held between guide members.

Incidentally, as shown in FIG. 12A, the above working is carried out while the first punches 56 and the second punches 58 are respectively guided by guide members 70*a* and 70*b*. A detailed explanation will be given of the point as follows.

Figure 12B:
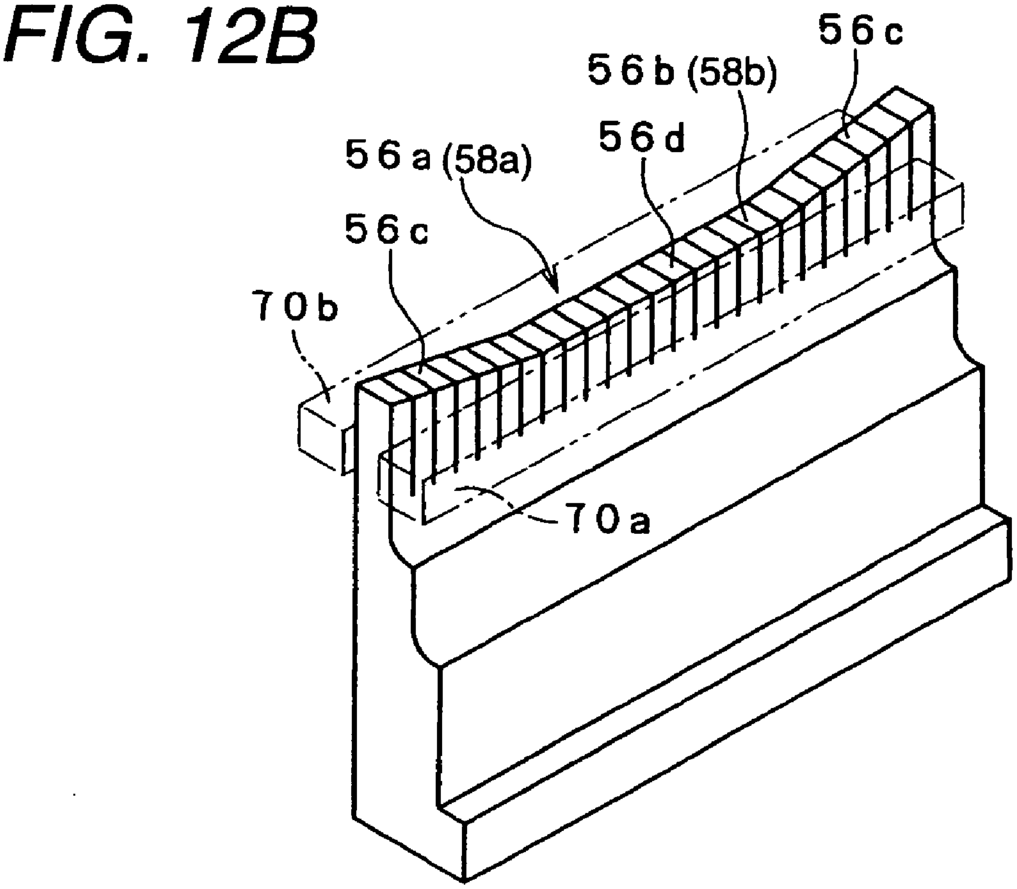
FIG. 12B is a perspective view of the first punch of FIG. 11I held between the guide members.

As shown in FIG. 12B, the first punches 56 and second punches 58 according to the first embodiment are respectively held between the guide members 70*a* and 70*b*.

Figure 12C:
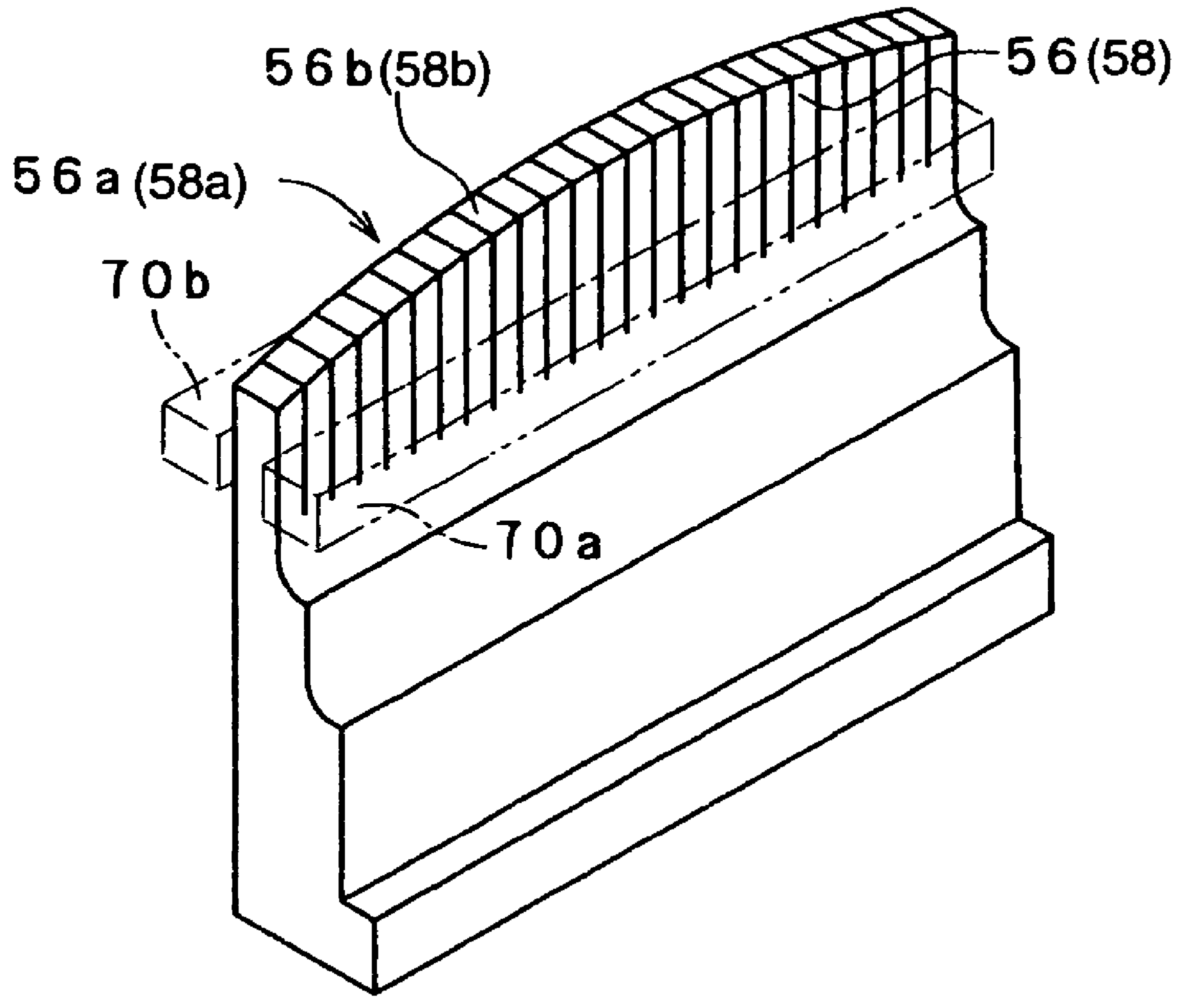
FIG. 12C is a perspective view of the first punch of FIG. 11N held between the guide members.

As shown in FIG. 12C, the first punches 56 and second punches 58 according to the second embodiment are respectively held between the guide members 70*a* and 70*b*.

Figure 13A:
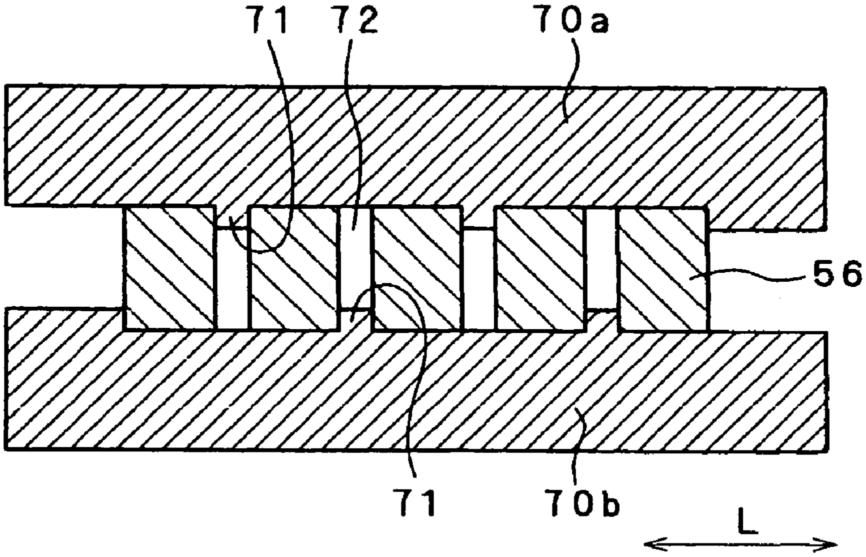
FIG. 13A is a horizontal section view of the state shown in FIG. 12.
Figure 13B:
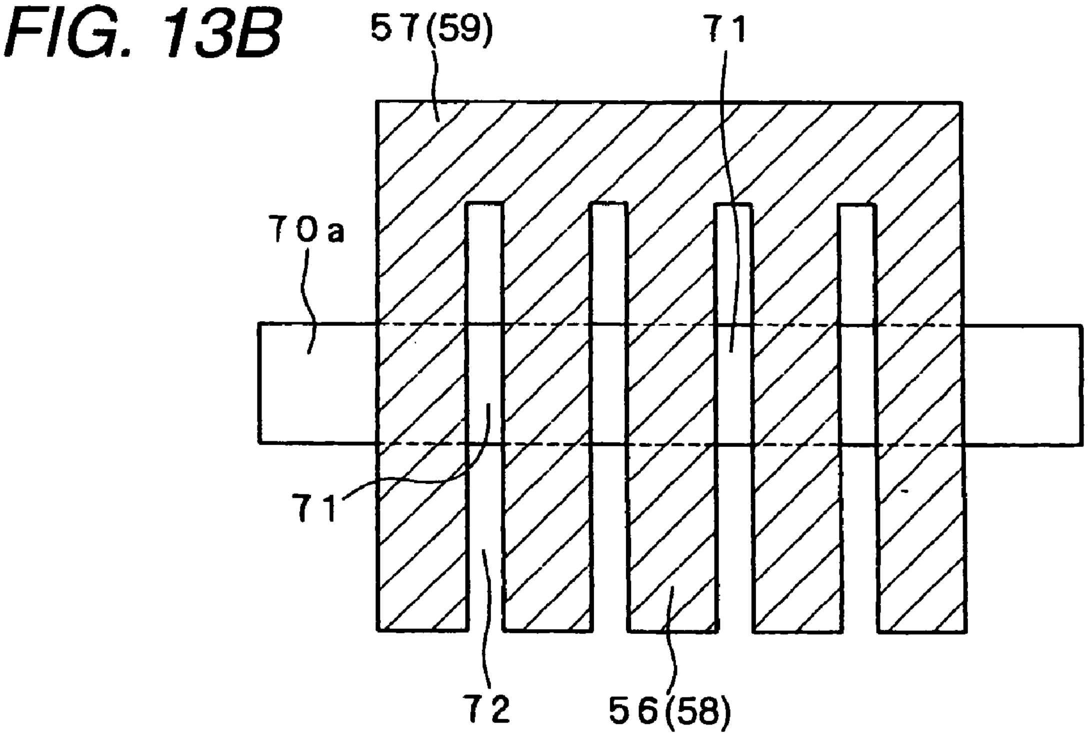
FIG. 13B is a vertical section view of the state shown in FIG. 12.

FIGS. 13A and 13B schematically shows the guide members 70*a* and 70*b* for guiding the respective punches 56, 58. Although only five sets of the punches 56, 58 are shown in the drawings, actually, the punches 56, 58 are aligned by a number as same as that of the elongated recess portions 33 for constituting the pressure generating chambers 29.

Figure 14:
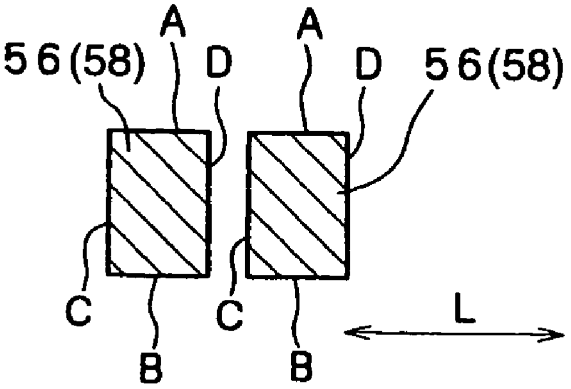
FIG. 14 is a horizontal section view of the punches.

As shown in FIG. 14, respective sectional shapes of the first and the second punches 56, 58 are rectangular and faces A and B including two parallel sides of the rectangular shape are aligned respectively along the aligning direction L at the predetermined pitch. Further, the two side faces A and B along the aligning direction of the respective aligned punches 56, 58 are guided by the guide members 70*a* and 70*b* from two directions.

The guide members 70*a* and 70*b* are in a shape of a pair of square rods extended in the aligning direction L of the punches 56, 58 and the two side faces A and B along the aligning direction of the respective punches 56, 58 are guided by inner side faces of the guide members 70*a* and 70*b* opposed to each other.

The respective guide members 70*a* and 70*b* are provided with projections 71 for guiding faces C and D of the punches 56, 58 facing a clearance 72 between the aligned punches 56, 58 (see FIG. 14). The projections 71 are formed to extend in the vertical direction over from upper ends to lower ends of the guide members 70*a* and 70*b* at inner side faces thereof. As shown in FIG. 13A, the projections 71*a*, for guiding outer side faces in the aligning direction L of the punches 56, 58 disposed at both end portions of the aligned punches 56, 58, are formed as a stepped shape.

Grinding the inner side faces of the guide members 70*a* and 70*b* so as to form grooves, the projections 71 and 71*a* are defined by the grooves. Since such a grinding work is relatively inexpensive means, the manufacturing cost can be reduced. Further, such a grinding work can provide the projections 71 and 71*a* with high accuracy, the guiding preciseness of the guide members 70*a* and 70*b* can be secured. The processing accuracy of the communicating port 34 can be accordingly secured.

As shown in FIG. 13A, the projections 71 are provided at every other clearance 72 between the aligned punches 56, 58 in the guide member 70*a* on one side and provided at every other clearance 72 also in the guide member 70*b* on other side. Therefore, two punches 56, 58 are placed between a pair of projections 71 in either guide member 70*a* or 70*b*. Further, the projections 71 are alternately arranged such that each punch 56, 58 is guided by a pair of projections 71 respectively provided on the guide members 70*a* and 70*b*.

In the one guide member 70*a*, two punches 56 or 58 are disposed between the adjacent projections 71. In the other guide member 70*b*, two punches 56 or 58 are disposed between the adjacent projections 71 at positions that are shifted by the pitch of the punches 56 or 58 from the positions of the nearest pair of punches 56 or 58 that are disposed between the adjacent projections 71 of the one guide member 70*a*.

Not only can an even superior method and tool for formation of minute holes be obtained but also a recording head 1 that is stable in quality can be manufactured and a manufacturing apparatus therefor can be obtained by combining the above-described workings and advantages of the punch arrays 56*a* and 58*a*, the contour lines 56*b* and 58*b*, etc. according to the invention with the following advantages of the guide members 70*a* and 70*b*.

By arranging the projections 71 in this way, four-directional guidance can be attained, so that bending or escaping of the punches 56, 58 in the midst of working can significantly be restrained. Accordingly, the shape accuracy, the dimensional accuracy and the alignment accuracy of each communicating port 34 can remarkably be promoted.

Further, since the projections 71 are provided at every other clearances 72 between the punches 56 and 57, numbers of the projections 71 formed at each of the guide members 70*a* and 70*b* can be reduced. Accordingly, the grinding work of the guide members 70*a* and 70*b* for forming the projections 71 can be simplified, so that the working cost can further be reduced.

In a state that the four side faces of each of the punches 56, 58 are guided by the inner side faces of the guide members 70*a* and 70*b* and projections 71 and 71*a*, the punches 56, 58 are pressed into the strip 55 to form the communicating ports 34 aligned in a row.

Since working can be carried out in a state of preventing bending or escaping of the punches 56, 58, wear or damage of the punches 56, 58 can significantly be reduced, so that tool life can significantly be prolonged. Accordingly, the accuracy of the communicating port 34 can be maintained over a long time period, which is advantageous in view of the quality control of the process.

Further, in this stage, the small communicating port 34 is formed by punching through the V-shaped bottom portion of the elongated recess portion 33 which has been plastically worked by pressing. Since such a portion has relatively higher hardness and workability is deteriorated, it is difficult to attain the working accuracy at the time of forming the small communicating port 34. However, according to the above configuration, since the bending or escaping of the punches are prevented by the guide members 70*a* and 70*b*, the working can be carried out with high accuracy while prolonging the lifetime of the dies.

Figure 15:
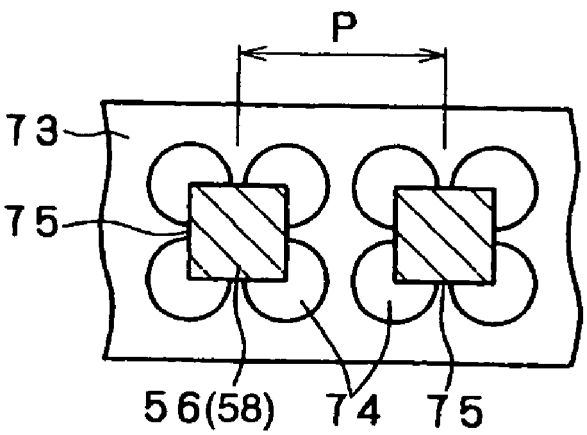
FIG. 15 is a view showing a first modified example of the guide members.

FIG. 15 shows a first modified example of the guide member for holding the punches in which the punch 56, 58 having a rectangular cross section is guided by guide portions 75 defined by quasi-circular holes 74. In such a case, since a guidance area of the guide portions 75 with respect to the punch is extremely small, wear or damage of the guide portion 75 is remarkable and the lifetime of the guide member 73 becomes short. On the other hand, according to the above guidance configuration, the guidance area can be widely secured, so that the lifetime of the guide members 70*a* and 70*b* can significantly be prolonged.

Further, in the case of FIG. 15, a certain pitch dimension P is needed so that it is difficult to simultaneously form minute holes aligned with a relatively small pitch. However, according to the invention, even in a case where the pitch P becomes small, since the punches 56, 58 can stably be guided, high working accuracy can be ensured.

The invention is effective when the pitch P is set to be 0.3 mm or less to form the communicating ports 34 aligned with the pitch. The invention is more effective when the pitch dimension P is 0.25 mm or less, and further effective when the pitch dimension is 0.2 mm or less.

Further, the invention is particularly effective when forming the communicating port 34 having the size of the opening of 0.2 mm or less, or when forming the minute hole in which a ratio of a thickness, that is, the penetrated dimension of the strip 55 with respect to the opening dimension of the communicating port 34 is 0.5 or more. Further, the invention is more effective in forming the minute hole having the ratio is 0.8 or more, and further effective when forming the minute hole having the ratio is 1 or more. In the embodiment, the opening dimension of the communicating port 34 is a rectangular shape of 0.095 mm×0.16 mm.

In the embodiment, since the communicating port 34 is fabricated by working at a plurality of times by using the punches 56, 58 having different thicknesses, even the extremely small communicating port 34 can be fabricated with excellent dimensional accuracy. Further, since the first communicating port 37 fabricated from the side of the elongated recess portion 33 is formed only up to the middle in the plate thickness direction, it is prevented a drawback that the partition wall portion 28 or the like of the pressure generating chamber 29 is excessively pulled downward. Thereby, the communicating port 34 can be fabricated with excellent dimensional accuracy without deteriorating the shapes of the V-shaped bottom portion of the elongated recess portion 33 and the partition wall portion 28.

Although steps of manufacturing the communicating ports 34 by two times of working are exemplified, the communicating ports 34 may be fabricated by working of three times or more. Further, when the above-described drawback is not brought about, the communicating port 34 may be fabricated by a single working.

After the communicating ports 34 are fabricated, both surfaces of the strip 55 are polished to flatten along the chain lines shown in FIG. 11C, so that the plate thickness is adjusted to a predetermined thickness (0.3 mm, in the embodiment).

The step of forming the elongated recess portions and the step of forming the communicating ports may be carried out by separate stages or carried out by the same stage. In a case where the steps are carried out by the same stage, since the strip 55 remains unmoved at both stages, the communicating port 34 can be fabricated in the elongated recess portion 33 with excellent positional accuracy.

After the chamber formation plate 30 is fabricated by the above-described steps, the flow path unit 4 is fabricated by bonding the elastic plate 32 and the nozzle plate 71 which are fabricated separately. In the embodiment, bonding of the respective members is carried out by adhering. Since the both surfaces of the chamber formation plate 30 are flattened by the above-described polishing, the elastic plate 32 and the nozzle plate 31 can firmly be adhered thereto.

Since the elastic plate 32 is the composite material constituting the support plate 42 by the stainless steel plate, the linear expansion rate is prescribed by stainless steel constituting the support plate 42. The nozzle plate 31 is also fabricated by the stainless steel plate. As described above, the linear expansion rate of nickel constituting the chamber formation plate 30 is substantially equal to that of stainless steel. Therefore, even when adhering temperature is elevated, warping caused by the difference between the linear expansion rates is not brought about. As a result, the adhering temperature can be set higher than a case where a silicon substrate is used, so that adhering time can be shortened and fabrication efficiency is promoted.

After the flow path unit 4 is fabricated, the vibrator unit 3 and the flow path unit 4 are bonded to the case 2 fabricated separately. Also in this case, bonding of the respective members is carried out by adhering. Therefore, even when the adhering temperature is elevated, warping is not brought about in the flow path unit 4, so that adhering time is shortened.

After the vibrator unit 3 and the flow path unit 4 are bonded to the case 2, the flexible cable 9 of the vibrator unit 3 and the connection board 5 are soldered, thereafter, the supply needle unit 6 is attached thereto to thereby provide the liquid ejecting head.

Figure 16:
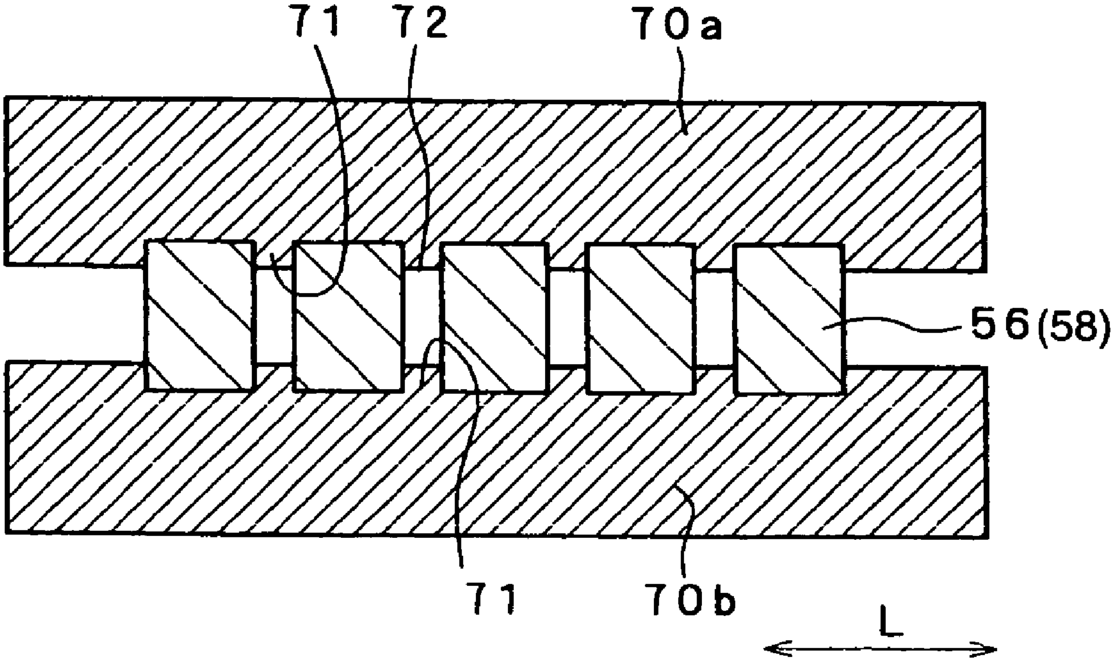
FIG. 16 is a horizontal section view showing a second modified example of the guide members.

FIG. 16 shows a second modified example of the guide members. In this case, the projections 71 at the inner side faces of the guide members 70*a* and 70*b* are provided at all of the clearances 72. By constituting in this way, the four side faces of the respective punches 56, 58 can firmly be guided and working with higher accuracy can be carried out.

Figure 17:
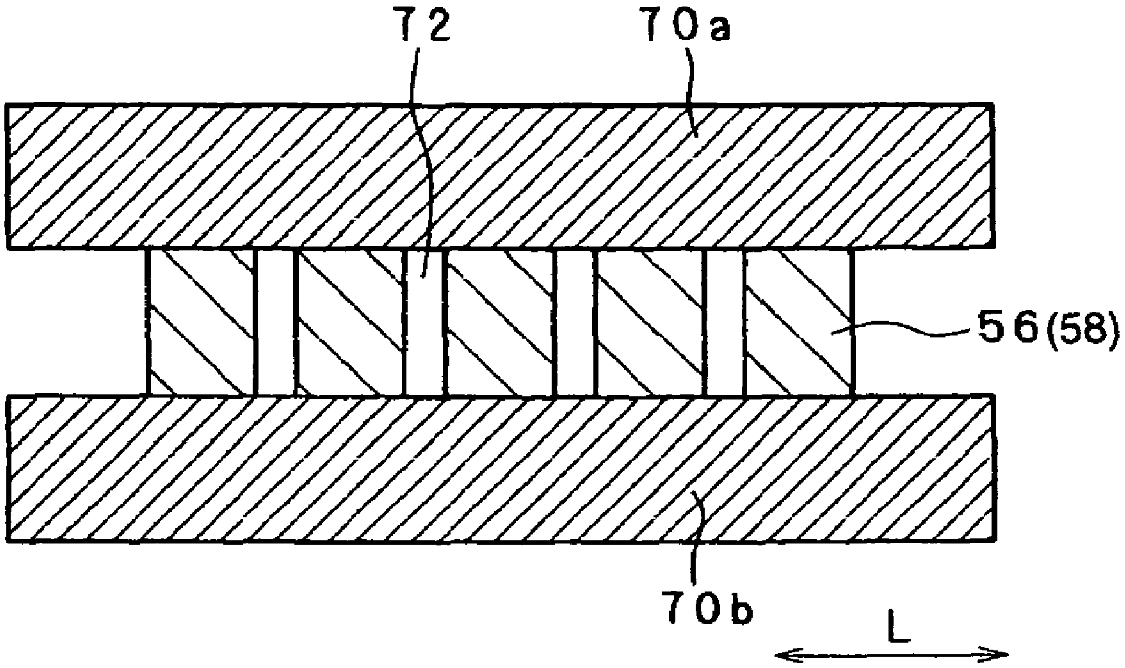
FIG. 17 is a horizontal section view showing a third modified example of the guide members.

FIG. 17 shows a second modified example of the guide members. In this case, the projections 71 are not formed at the inner side faces of the guide members 70*a* and 70*b* and only the two faces A and B of the respective punches 56, 58 are guided. With such a configuration, cost can be saved by simplifying the shapes of the guide members 70*a* and 70*b* while ensuring the guiding effect.

A manufacturing method of the recording head 1 according to the invention is performed in such a manner that an array of elongated recess portions 33 are formed in a strip 55 and communicating ports 34 are formed in the elongated recess portions 33 by one of the above working methods. Therefore, even if the strip 55 is warped by the formation of the elongated recess portions 33, the communicating ports 34 can be formed with very high accuracy in the elongated recess portions 33 as precise structures. The ink ejection characteristic of the recording head 1 can be kept good.

Next, an explanation will be given of an apparatus for manufacturing a liquid ejecting head using the method of punching the communicating port.

Figure 19:
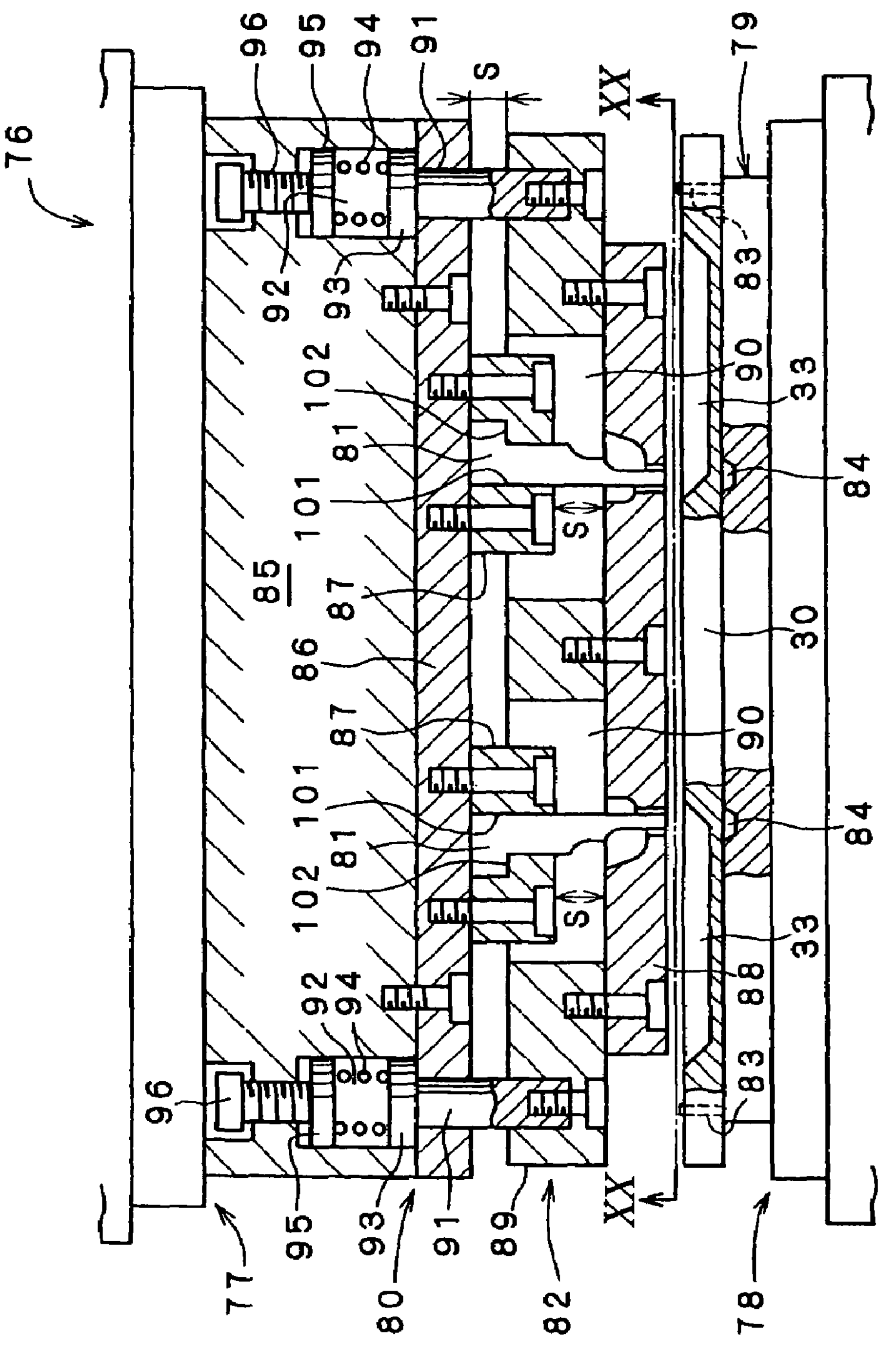
FIG. 19 is a partially sectional view showing an apparatus for manufacturing a liquid ejecting head.

As shown in FIG. 19, the manufacturing apparatus 76 is roughly constituted by: an upper operation unit 77; a lower operation unit 78; a first die 79 fixed to the lower operating portion 78; a second die 80 fixed to the upper operation unit 77; a male die 81 fixed to the second die 80; and a guide member 82 attached to the second die 80 for guiding the male die 81.

In the apparatus, the upper operation unit 77 is operated to move vertically by a driving device (not illustrated).

In the first die 79, the chamber formation plate 30 corresponding to the above described strip 55 is placed at a predetermined position defined by reference pins 83. The first die 79 is formed with openings 84 for each receiving the male die 81. The chamber formation plate 30 is previously formed with the elongated recess portions 33 by the steps shown in FIGS. 10A to 10C.

The second die 80 is constituted by a base member 85 coupled to the upper operation unit 77 and a punch plate 86 coupled to the base member 85. The punch plate 86 is attached with the male die 81 via a fixing piece 87. Two male dies 81 are provided in association with two rows of elongated recess portions 33 to form the communicating ports 34 therein.

The guide member 82 is integrally formed with a guide plate 88 and a guide base member 89, and is provided with a space 90 for avoiding interference with the fixing piece 87 and allowing relative displacement, mentioned later. The guide member 82 corresponds to the above-described guide member 70*a* or 70*b* and is constructed by a structure of integrating the guide plate 88 and the guide base member 89 by illustrated bolts, however, these members may be constituted by a single member, or may be constituted by three or more members.

The guide member 82 is attached to the second die 80 while being able to move relative to the actuating direction of the male die 81. Actuating shafts 91 are fixed to the guide base member 89 while being extended in parallel with the actuating direction of the upper operation unit 77. An upper end portion of each actuating shaft 91 is extended into a chamber 92 formed in the base member 85. The chamber 92 is a cylinder-shaped space having a circular cross section whose inner diameter is larger than a diameter of the actuating shaft 91 also having a circular cross section. A stopper 93 is fixed to an upper end of the actuating shaft 91, so that the stopper 93 is capable of moving vertically in the chamber 92 like a piston. A compression coil spring 94 is inserted into the chamber 92 to urge the stopper 93 in a direction that the guide member 82 is separated from the second die 80. A bolt 96 is provided to adjust a position of a spring seat 95 to thereby adjust the urging force of the coil spring 94 acting on the stopper 93. The compression coil spring 94 may be replaced with a rubber piece.

In order to move the guide member 82 relative to the second die 80, a displacement space S is provided between the second die 80 and the guide member 82. Also in the space 90, a similar displacement space is provided between a lower face of the fixing piece 87 and an upper face of the guide plate 88.

Figure 22:
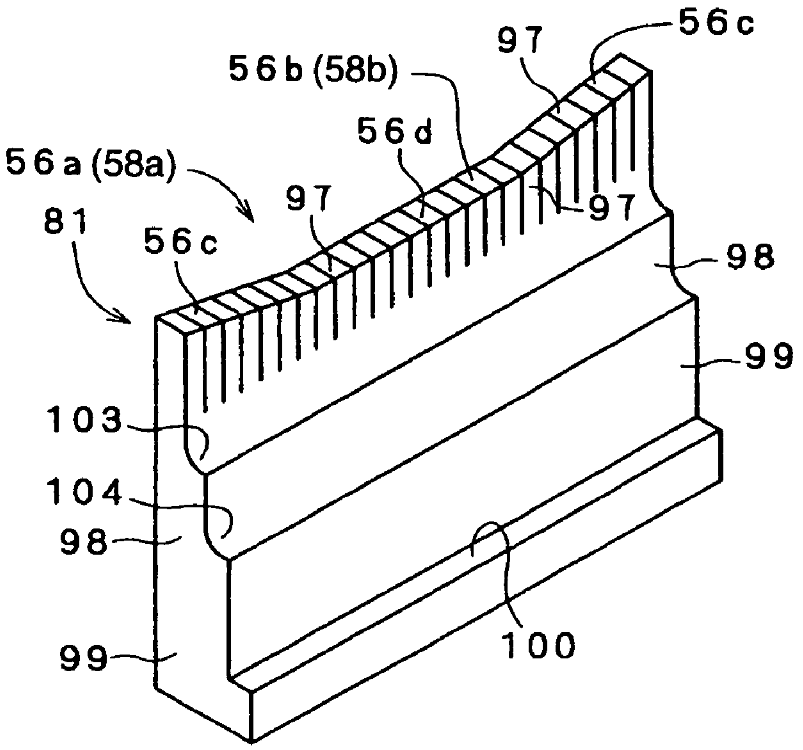
FIG. 22 is a perspective view of a male die incorporated in the manufacturing apparatus and corresponding to the second male die of FIG. 11I.
Figure 23:
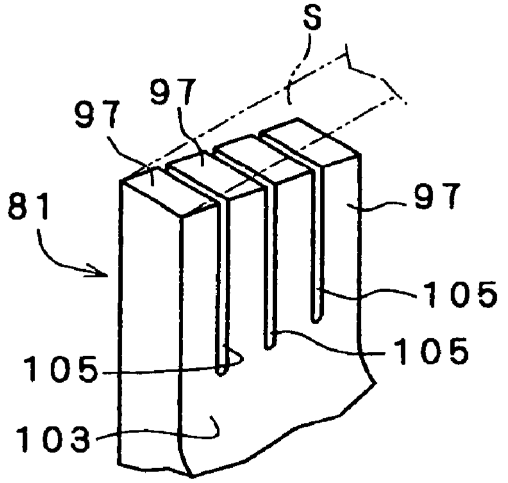
FIG. 23 is an enlarged perspective view showing a distal end portion of the male die of FIG. 22.
Figure 25A:
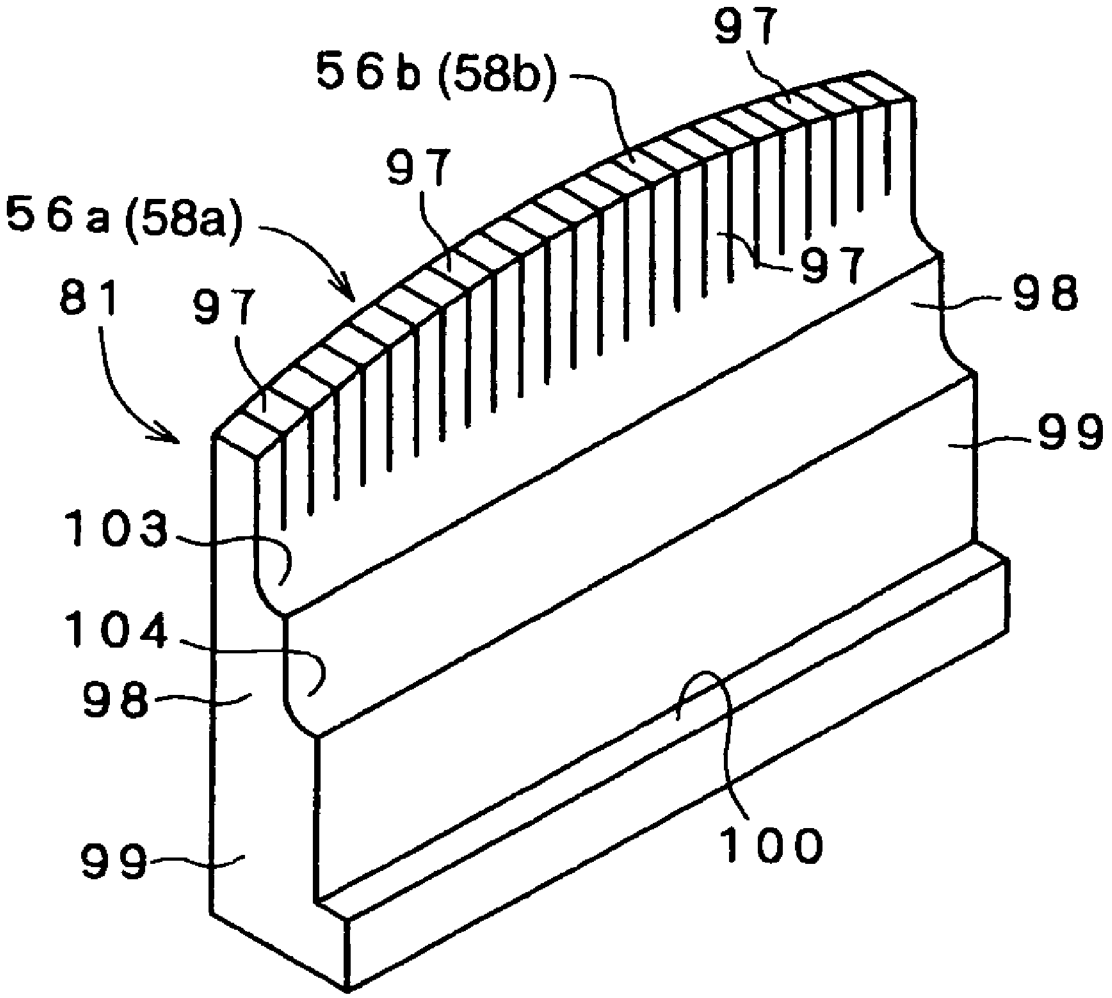
FIG. 25A is a perspective view of a male die incorporated in the manufacturing apparatus and corresponding to the second male die of FIG. 11N.

FIGS. 22 and 23 are perspective views respectively showing an entire shape and a punch portion of the male die 81. The male die 81 corresponds to the second male die 57 or the third male die 59 according to the first embodiment, and a number of punches 97 are arranged in a row at a distal end portion thereof. Similarly, FIGS. 25A and 25B are perspective views respectively showing an entire shape and a punch portion of the male die 81 which corresponds to the second male die 57 or the third male die 59 according to the second embodiment.

The punches 97 are continued from a high rigidity portion 98 such that a sectional area of the high rigidity portion is larger than a total sectional area of the punches 97. Further, the high rigidity portion 98 is continued from a base portion 99 having a higher sectional area than that of the high rigidity portion 98.

Further, the base portion 99 is formed with a flange 100 in a direction substantially orthogonal to the actuating direction of the male die 81. The fixing piece 87 is provided with an elongated hole 101 into which the base portion 99 is inserted and a retaining face 102 which abuts against the flange 100. The punches 97 and the high rigidity portion 98 or the high rigidity portion 98 and the base portion 99 are smoothly connected by curved faces 103 and 104.

Figure 25B:
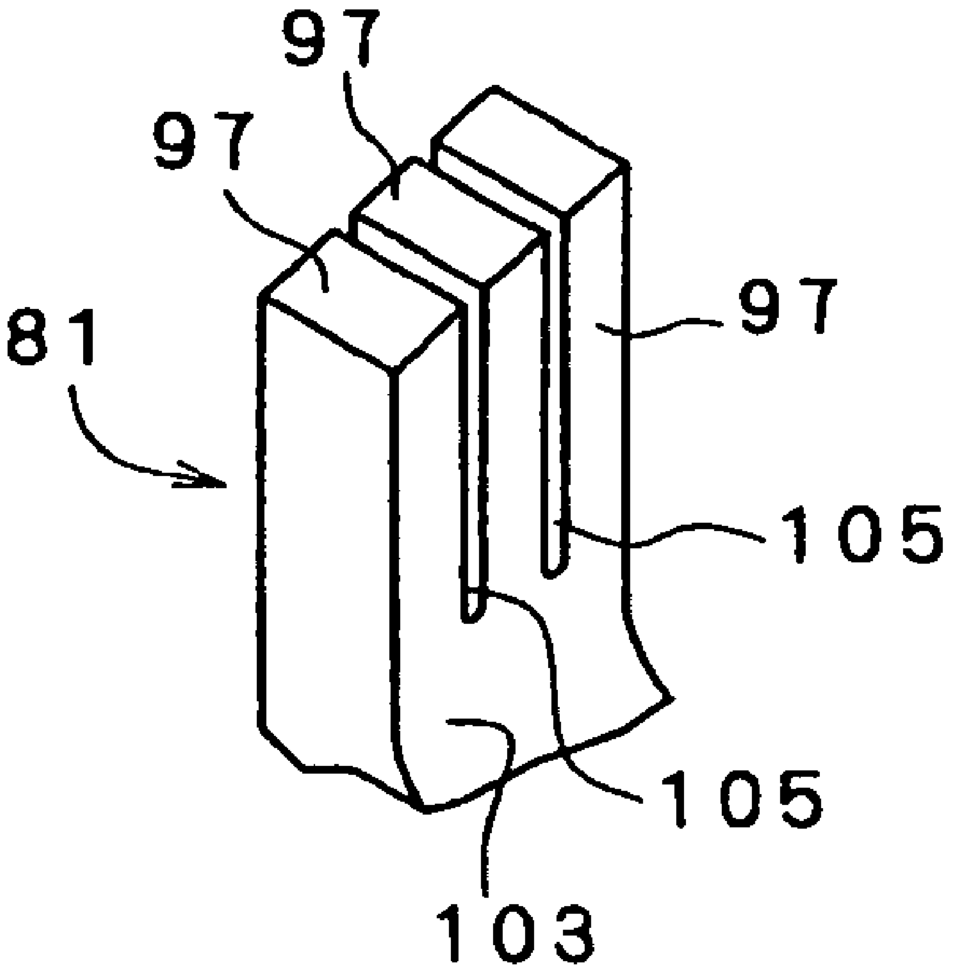
FIG. 25B is an enlarged perspective view showing a distal end portion of the male die of FIG. 25A.

As shown by FIGS. 23 and 25B, a slit 105 is provided between the contiguous punches 97 and a pitch of the respective punches 97 are as same as a pitch of the elongated recess portions 33.

Figure 20:
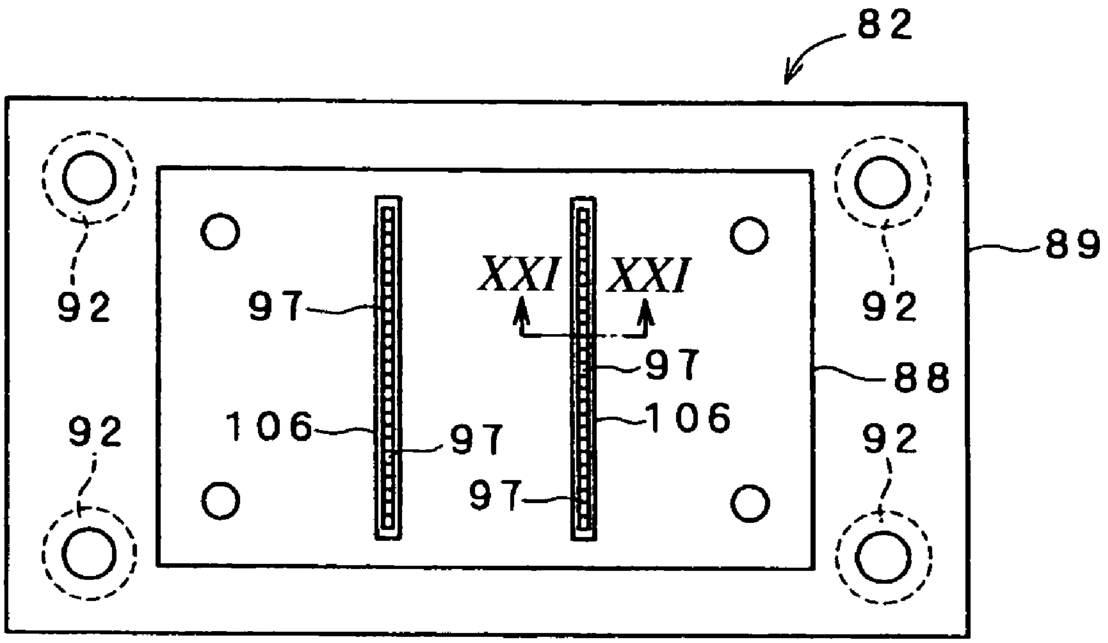
FIG. 20 is a plan view taken along a line XX-XX in FIG. 19.
Figure 21:
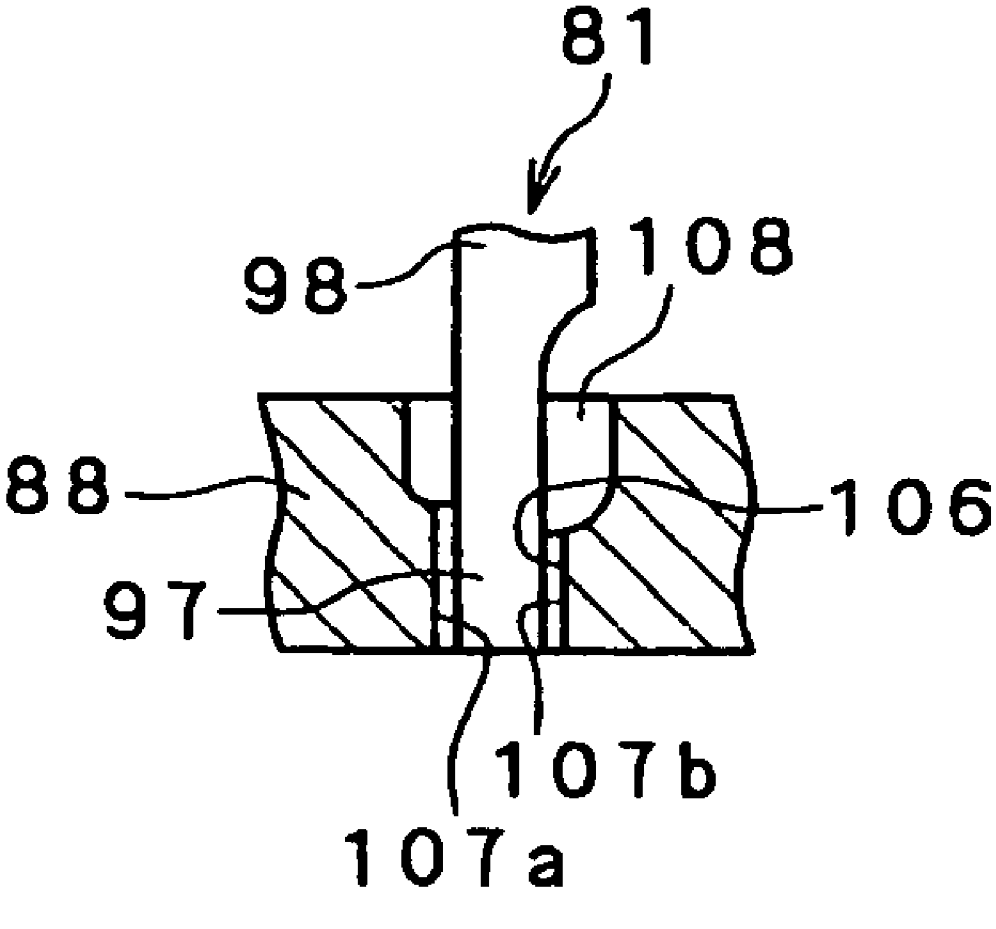
FIG. 21 is a section view taken along a line XXI-XXI in FIG. 20.

The male die 81 is placed at a such a position that each of the punches 97 arrayed in a direction perpendicular to the longitudinal direction of each elongated recess portion 33 opposes to one longitudinal end portion of each elongated recess portion 33. In the embodiment, the guide member 82 guides a portion of the male die 81 where the punches 97 are provided, and the guide member 82 is formed with a slit hole 106 through which the punches 97 are allowed to penetrate, as shown in FIG. 20. Inner faces of the slit hole 106 opposed to each other serve as control faces 107*a* and 107*b* for restraining the punches 97 from displacing in the longitudinal direction of the elongated recess portion 33. The control faces 107*a* and 107*b* are brought into a sliding contact with both side portions of the punches 97. Alternatively, small clearances may be provided between the control faces 107*a* and 107*b* and the both side portions of the punches 97. In FIGS. 19 and 21, although the clearance is illustrated to be considerably large, the actual clearance is provided such an extent that the above-described sliding contact may be established. The guide plate 88 is formed with a slender recess groove 108 continued from the slit hole 106, for receiving the high rigidity portion 98, as shown in FIG. 21.

FIG. 19 shows a state before the forging work for forming the communicating ports 34 is started. In this state, the stopper 93 is brought into close contact with the lower face of the chamber 92 by the spring force of the compression coil spring 94 to define a relative position between the guide plate 88 and the punches 97. Further, in this state, the lower face of the guide plate 88 and the distal end faces of the punches 97 are made flush with each other.

Figure 24:
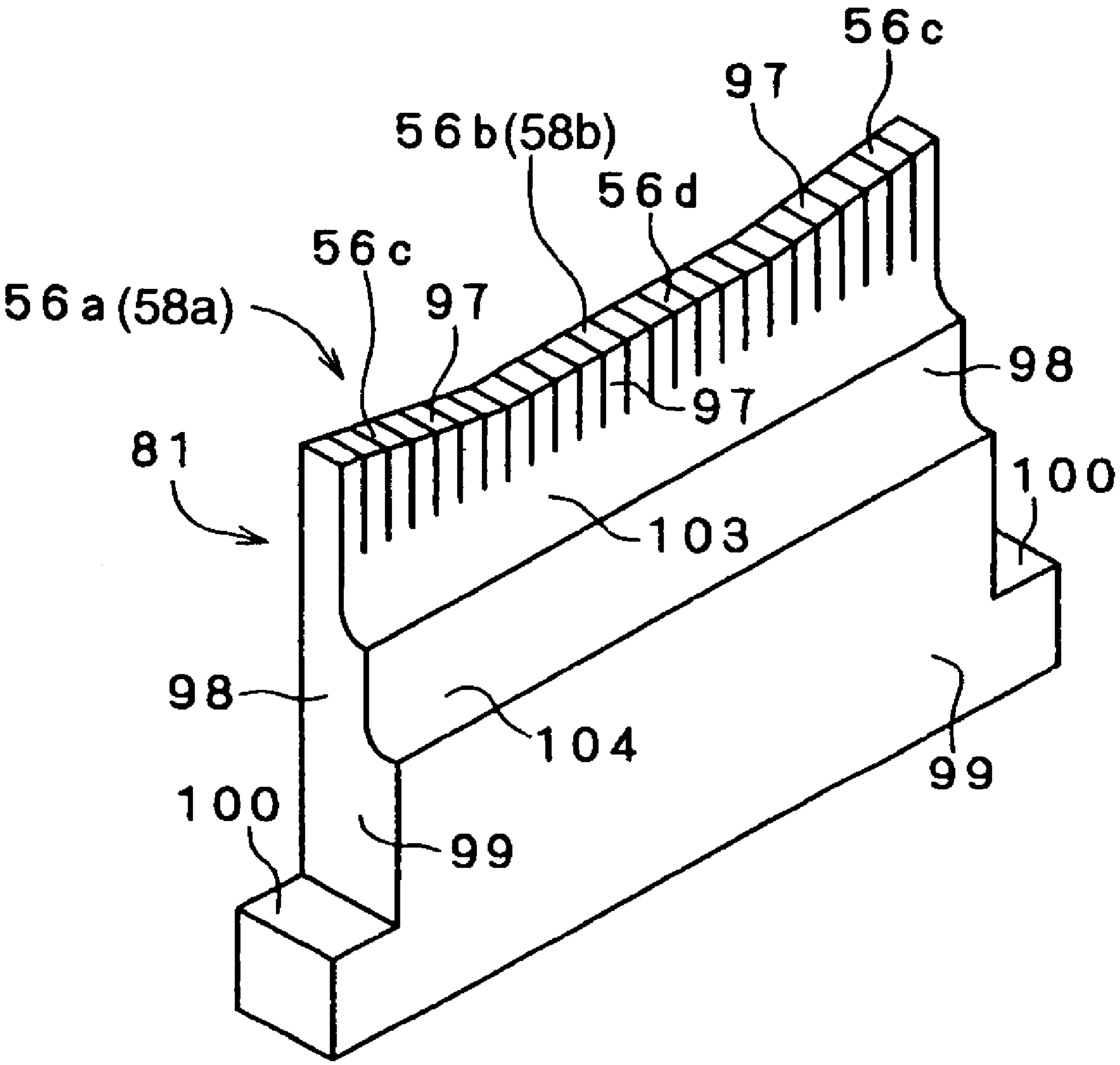
FIG. 24 is a perspective view showing a first modified example of the male die of FIG. 22.

FIG. 24 shows a first modified example of the male die 81 corresponding to the first embodiment in which the flange 100 is formed on both side end faces of the male die 81.

Figure 25C:
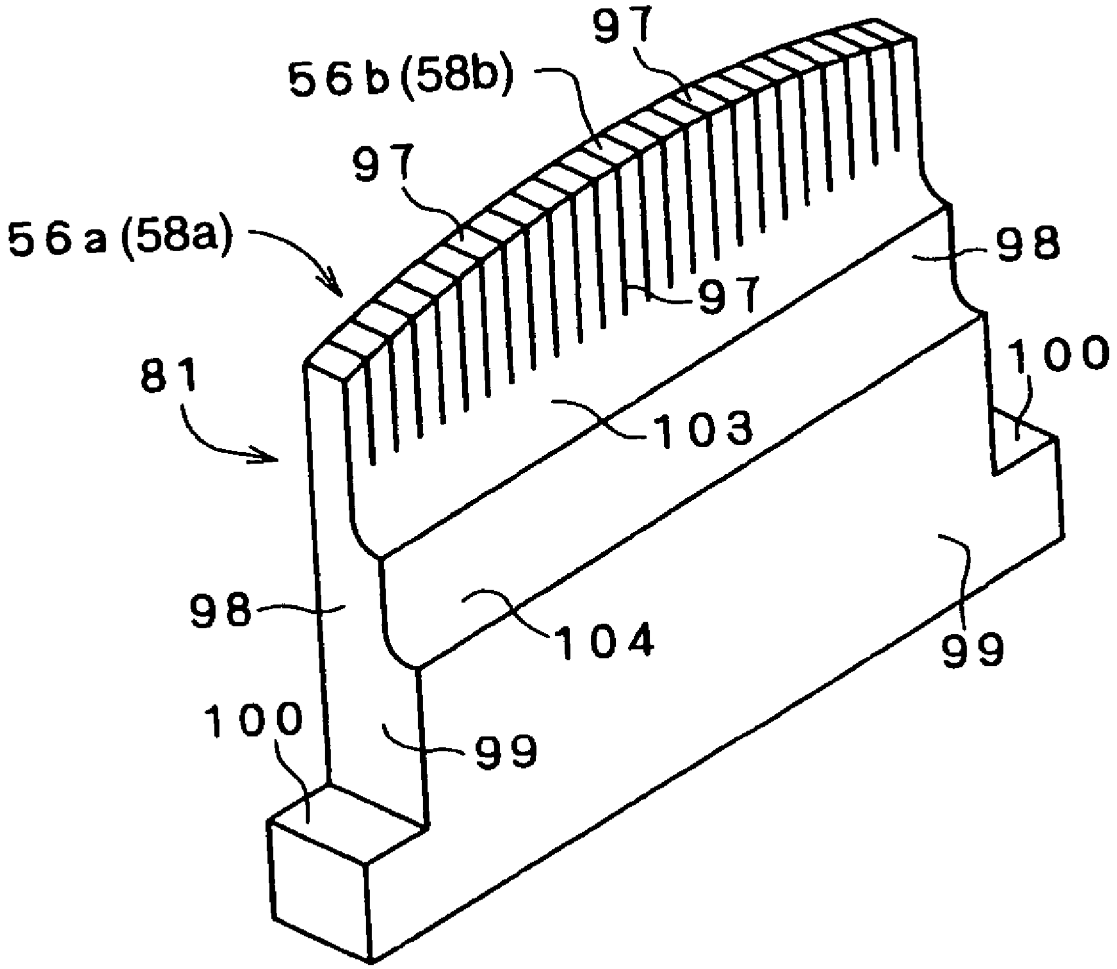
FIG. 25C is a perspective view showing a modified example of the male die of FIG. 25A.

FIG. 25C shows a first modified example of the male die 81 corresponding to the second embodiment in which the flange 100 is formed on both side end faces of the male die 81.

Operation of the apparatus 76 of manufacturing the recording head will be explained.

When the second die 80 is lowered from the state shown in FIG. 19, the guide plate 88 and the punches 97 are also lowered while maintaining their relative position relationship. Then the guide plate 88 is first brought into close contact with the chamber formation plate 30 so that the guide member 82 is stopped. Thereafter, when the second die 80 is lowered further, the punches 97 are projected from the guide plate 88 while the compression coil spring 94 are cut into the end portions of the elongated recess portions 33. When a press length of the punches 97 reaches a predetermined level, the second die 80 is lifted up so that the punches 97 are retracted from the chamber formation plate 30 while the guide plate 88 is pressing the chamber formation plate 30 by the compression coil spring 94.

In the manufacturing apparatus 76, the punches 56 and 58 according to the first embodiment in which the distal end faces 56*g* of at least punches 56 and 58 located at and near the ends of the punch arrays 56*a* and 58*a* are slant faces in which the lowermost position recedes more in the punch digging direction as the position goes closer to the center of the punch arrays 56*a* and 58*a* are dug into the bottom portions of the elongated recess portions 33. Therefore, even if the chamber formation plate 30 is warped by the formation of the elongated recess portions 33, the punches 56 and 58 at and near the ends of the punch arrays 56*a* and 58*a* can first be dug into the bottom portions of the elongated recess portions 33. As a result, the communicating ports 34 can be formed with very high accuracy in the elongated recess portions 33 that are precise structures and the ink discharge characteristic of the recording head 1 can be kept good.

In the manufacturing apparatus 76, the punches 56 or 58 according to the second embodiment are dug into the bottom portions of the elongated recess portions 33 in a state that the shape of the contour line 56*b* or 58*b* of the first punch array 56*a* or 58*a* is made identical or approximately identical to the warped shape of the strip 55. Therefore, even if the strip 55 is warped by the formation of the elongated recess portions 33, the punches 56 or 58 can be dug into the bottom portions of the elongated recess portions 33 uniformly. As a result, communicating ports 34 can be formed with very high accuracy in the elongated recess portions 33 as precise structures. The ink ejection characteristic of the recording head 1 can be kept good.

Owing to the structure that the press work is carried out while guiding the both side portions of the punches 97 by the control faces 107*a* and 107*b* in the slit hole 106 formed at the guide plate 88, bending or escape of the punches 97 by stresses produced by working is prevented. Accordingly, the shape, dimensional and alignment accuracy of each communicating port 34 are enhanced. Further, wear or damage of the punches 97 can considerably be reduced and tool life can considerably be prolonged, the accuracy of the communicating port 34 can be maintained over a long time period. Further, the communicating port 34 can be worked with excellent dimensional accuracy without deteriorating contiguous ones of the communicating ports 34 even in a case where the communicating ports 34 which are aligned at a relatively small pitch.

Since the elongated recess portion 33, which has been subjected to the plastic working in advance, has relatively higher hardness and workability is deteriorated, it is difficult to attain the working accuracy at the time of forming the small communicating port 34. However, according to the above configuration, since the bending or escaping of the punches 97 are prevented by the guide member 82, the working can be carried out with high accuracy while prolonging the lifetime of the dies.

Even in a case where the press length of the punches 97 to the chamber formation plate 30 is prolonged, since the guide plate 88 is brought into close contact with the surface of the chamber formation plate 30 or disposed at the extreme vicinity of the chamber formation plate 30, the guiding function of the guide plate 88 is achieved at the location as proximate as possible to the portion of generating stresses produced by working, so that the bending or escape of the punches 97 by working stresses can further securely be prevented.

Although the punches 97 are more liable to be bent or escaped in the longitudinal direction substantially orthogonal to the aligning direction than in the aligning direction, by restraining the displacement of the punches 97 by the control faces 1 07*a* and 107*b*, bending or escape of the punches 97 are prevented so that the communicating ports 34 are formed with high accuracy.

Since the control faces 107*a* and 107*b* are defined by the inner faces of the slit hole 106 formed in the guide plate 88, such inner faces has high rigidity capable of withstanding large load. Therefore, the control faces 107*a* and 107*b* can be made to carry out stable guiding function. Further, since the control faces 107*a* and 107*b* can be ensured immediately by forming the slit hole 106, the control faces 107*a* and 107*b* can be provided by simple constitution.

The relative positions of the guide plate 88 and the punches 97 before starting the punching work are accurately set by the actuating shaft 91, the stopper 93, the compression coil spring 94 and the like. That is, it is surely possible to determine the proper relative positions of the punches 97 and the guide plate 88 in which the punches 97 abnormally projected from the guide plate 88. Further, when the punches 97 are pressed, since the guide plate 88 is pressed onto the chamber formation plate 30 by the compression coil spring 94, the guiding function of the guide plate 88 is achieved at the location most proximate to the punching portion, so that bending or escape of the punches 97 can be prevented at the optimum location.

The sectional areas of the punches 97, the high rigidity portion 98 and the base portion 99 are successively increased and the rigidity of the total of the male die 81 is set to be the largest at the base portion 99. Therefore, since the rigidity of the male die 81 is increased gradually toward the fixed side, stresses are not abnormally concentrated on a particular location of the male die 81 when the punches 97 are actuated. Accordingly, the durability of the total structure of the male die 81 can be enhanced. Further, the rigidity of attaching the male die 81 to the second die 80 can be ensured in the stable state, so that durability sufficient for frequent punching operation can be attained.

Since the male die 81 is attached to the fixing piece 87 while the flange 100 is firmly retained, the rigidity of attaching the male die 81 to the second die 80 can be increased. Particularly, when the punches 97 pressed into the chamber formation plate 30 is withdrawn, it is necessary to transmit the large withdrawing force from the second die 80 to the male die 81. In such an occasion, since the flange 100 is pressed by the retaining face 102 of the fixing piece 87, the male die 81 and the second die 80 can be withdrawn with firm integrity, so that the manufacturing apparatus 76 having excellent operational stability is provided.

By a plurality of the male dies 81, the communicating ports 34 can be formed by one operation at the respective elongated recess portions 33 so that the productivity can be promoted. Further, even when two of the male dies are arranged to be able to form two rows of the communicating ports in parallel, promotion of productivity is also achieved.

Further, the guide plate 88 is provided with a simple structure while realizing multi-function. That is, the slit hole 106 achieving guiding function and a bottom face for pressing the chamber formation plate 30.

An slope face 109 is formed at a longitudinal end portion of the elongated recess portion 33 and the punches 97 are pressed into the slope face 109. In order to form the slope face 109, as shown in FIG. 8A, the both longitudinal end portions 53*b* of the distal end portion 53*a* of each projection 53 are tapered. When the projection 53 is pressed into the chamber formation plate 30, the elongated recess portion 33 having the slope face 109 is formed at the longitudinal end portion. Relative positions of the punches 97 and the chamber formation plate 30 are set such that the punches 97 are pressed to the inclined plate 109 while the pressure generating forming plate 30 is supported at the predetermined position of the first die 79. The communicating port 34 is formed at the slope face 109 by lifting down the male die 81. Others are similar to the above-described embodiment and similar portions are designated with the same reference numerals.

The distal end portion of the punch 97 is pressed to the slope face 109 at the initial stage so that large bending moment is act on the punch 97. However, since the punches 97 are guided by the guide plate 88, the bending moment can firmly be received by the guide plate 88 so that the communicating port 34 can be formed without bringing about bending or escape at the punches 97 even in such a case. Further, the punch 97 is accurately pressed into the slope face 109, and the material flow smoothly accompanies with the punch 97. Therefore, burrs projecting into the elongated recess portion 33 can be prevented from being formed. Accordingly, bubbles in liquid flow will not stay in the flow path so that the ejection property of liquid ejecting head can normally be maintained.

Figure 26A:
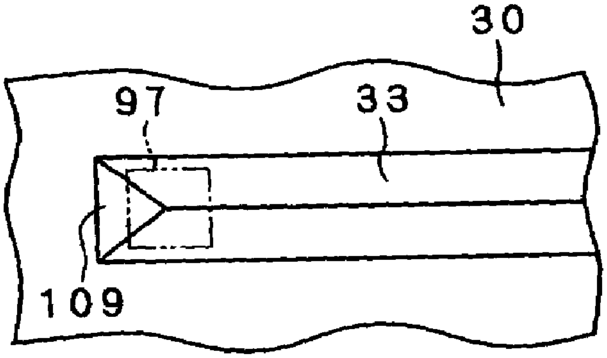
FIG. 26A is a plan view for explaining how to form a communicating hole in an elongated recess portion.
Figure 26B:
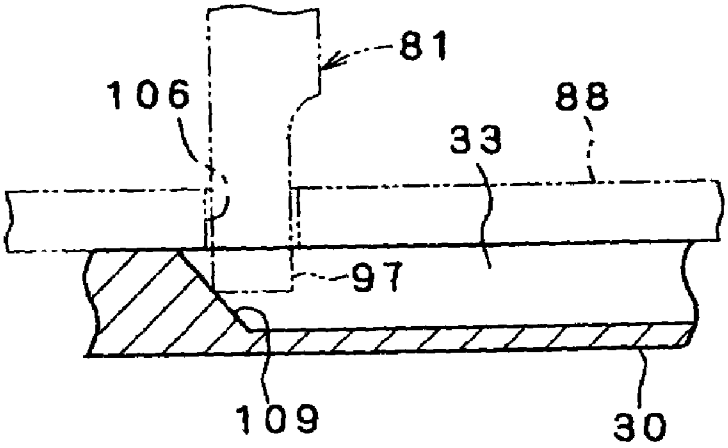
FIG. 26B is a sectional view for explaining how to form the communicating hole in the elongated recess portion.

Since the elongated recess portion 33 is constituted by the V-shaped bottom faces, when the punch 97 having a rectangular cross section is pressed into the longitudinal end portion of the elongated recess portion 33, the distal end portion of the punch 97 is pressed onto both of the V-shaped bottom faces and the slope face 109 as shown in FIG. 26A. Therefore, the above-described burrs or the like can be prevented from being brought about also in the V-shaped bottom faces.

Figure 27:
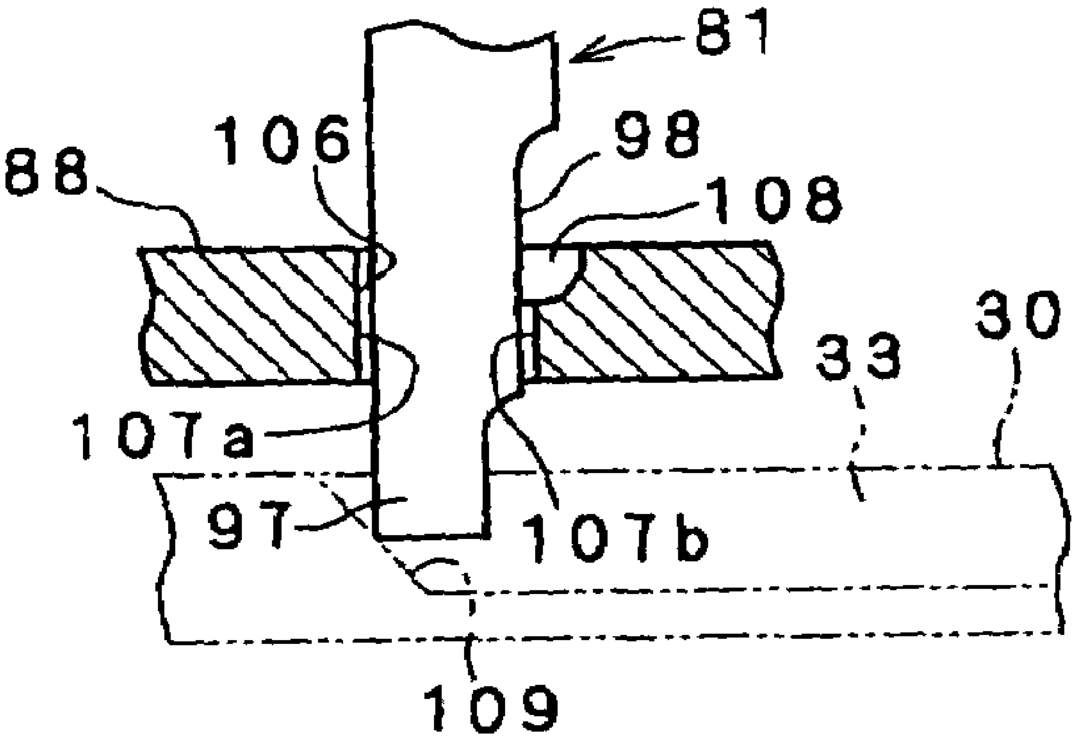
FIG. 27 is a section view for explaining a second modified example of the male die of FIG. 22.

FIG. 27 shows a second modified example of the male die 81. This configuration is applicable for the second male die 57 or the third male die 59 according to both of the first embodiment and the second embodiment.

In this case, the high rigidity portion 98 is guided by the guide plate 88. Others are similar to the above-described respective embodiments and similar portions are designated with the same reference numerals.

Since the high rigidity portion 98 having a relatively high rigidity is guided, the state of guiding the male die 81 is stabilized. Further, only a length of the punch 97 required for realizing the punching work may be ensured at the punch portion without ensuring a length required for guiding. Therefore, the length of the punches 97 can substantially be shortened and rigidity against bending or escape or the like of the punches 97 per se can be enhanced. Otherwise, the operation and the obtained advantages are similar to those of the above embodiments.

Meanwhile, the invention is not limited to the above-described embodiments but can variously be modified based on the description of the appended claims.

For example, with regard to the partition wall portion 28, when the proximal portion is more thick-walled than the distal end portion, the rigidity of the partition wall portion 28 can be increased and the volume necessary for the pressure related chamber 29 can be ensured. From the view point, the shape of the bottom of the elongated recess portion is not limited to V-shaped. For example, the bottom face of the elongated recess portion 33 may have an arcuate cross section. Further, in order to fabricate the elongated recess portion 33 having such a bottom shape, the first male die 51 having the projection 53 the distal end portion of which is arcuately chamfered.

With regard to a pressure generating element, an element other than the piezoelectric vibrator 10 may be adopted. For example, an electromechanical conversion element of an electrostatic actuator, a magnetorestrictive element or the like may be used. Further, a heat generating element may be used as a pressure generating element.

Figure 18:
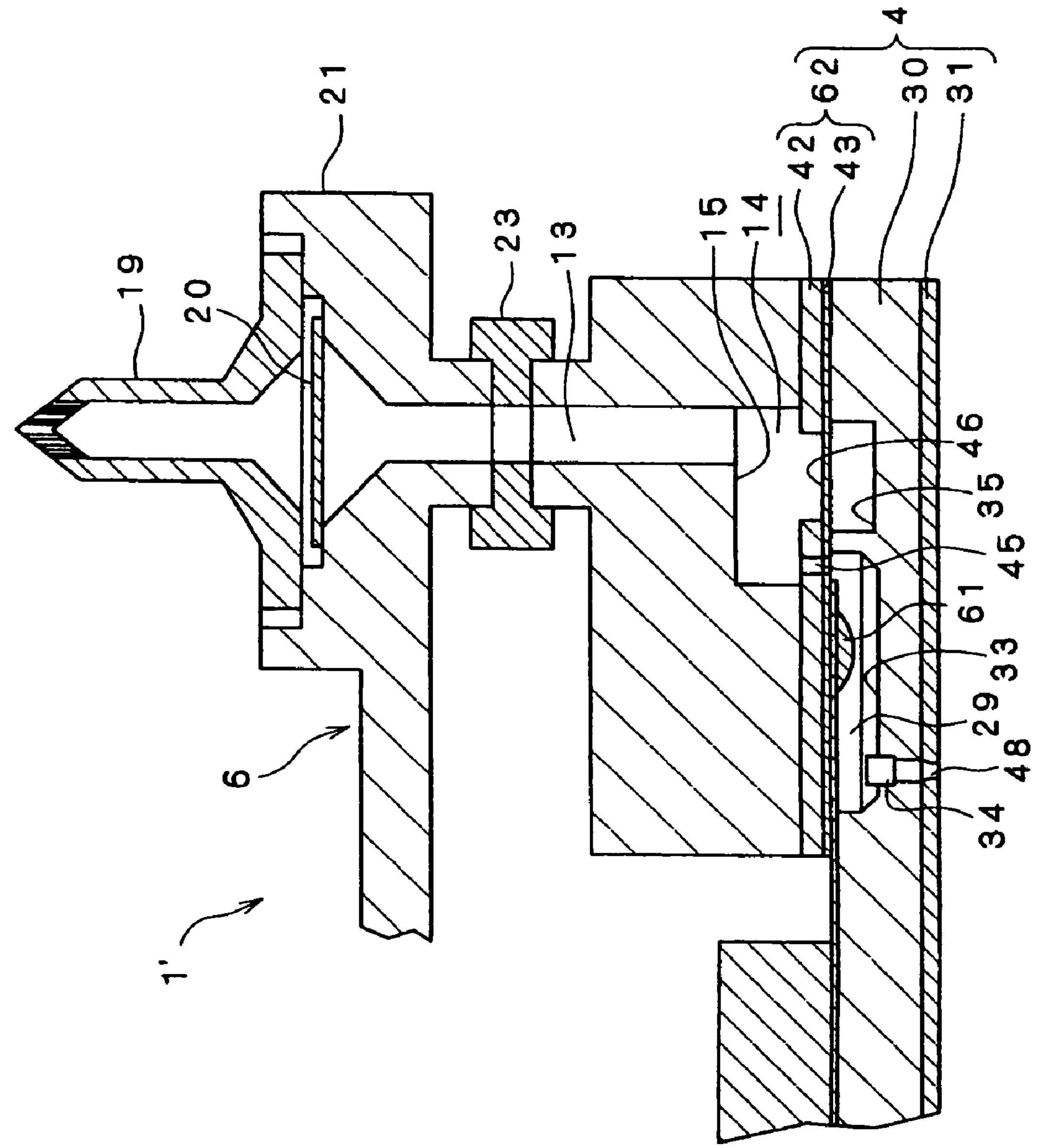
FIG. 18 is a sectional view for explaining an ink jet recording head incorporating heat generating elements.

Specifically, a recording head 1' shown in FIG. 18 comprises a heat generating element 61 as the pressure generating element. According to the embodiment, in place of the elastic plate 32, a sealing board 62 provided with the compliance portion 46 and the ink supply port 45 is used and the side of the elongated recess portion 33 of the chamber formation plate 30 is sealed by the sealing board 62. Further, the heat generating element 61 is attached to a surface of the sealing board 62 at inside of the pressure generating chamber 29. The heat generating element 61 generates heat by feeding electricity thereto via an electric wiring.

Since other constitutions of the chamber formation plate 30, the nozzle plate 31 and the like are similar to those of the above-described embodiments, explanations thereof will be omitted.

In the recording head 1', by feeding electricity to the heat generating element 61, ink at inside of the pressure generating chamber 29 is bumped and bubbles produced by the bumping presses ink at inside of the pressure generating chamber 29, so that ink drops are ejected from the nozzle orifice 48.

Even in the case of the recording head 1', since the chamber formation plate 30 is fabricated by plastic working of metal, advantages similar to those of the above-described embodiments are achieved.

With regard to all the above-described plastic workings, in order to achieve desired accuracy, cold working is preferably performed. More preferably, temperature control is conducted such that temperature of a worked object falls within a constant range.

With regard to the material for manufacturing the chamber formation plate 30, in the view point of forming the proximal portion of the partition wall 28 to be thick-walled than the distal end portion, the material is not limited to that of a single metal plate. For example, a laminated plate material fabricated by laminating a plurality of plate materials may be used, and the chamber formation plate 30 may be fabricated by a coating plate coated with a resin on a surface of a metal board.

With regard to the communicating port 34, although according to the above-described embodiments, an example of providing the communicating port 34 at one end portion of the elongated recess portion 33 has been explained, the invention is not limited thereto. For example, the communicating port 34 may be formed substantially at center of the elongated recess portion 33 in the longitudinal direction and the ink supply ports 45 and the common ink reservoirs 14 communicated therewith may be arranged at both longitudinal ends of the elongated recess portion 33. Thereby, stagnation of ink at inside of the pressure generating chamber 29 reaching the communicating port 34 from the ink supply ports 45 can be prevented.

Further, although according to the above-described embodiments, an example of applying the invention to the recording head used in the ink jet recording apparatus has been shown, an object of the liquid ejecting head to which the invention is applied is not constituted only by ink of the ink jet recording apparatus but glue, manicure, conductive liquid (liquid metal) or the like can be ejected.

For example, the invention is applicable to a color filter manufacturing apparatus to be used for manufacturing a color filter of a liquid-crystal display. In this case, a coloring material ejection head of the apparatus is an example of the liquid ejecting head. Another example of the liquid ejection apparatus is an electrode formation apparatus for forming electrodes, such as those of an organic EL display or those of a FED (Field Emission Display). In this case, an electrode material (a conductive paste) ejection head of the apparatus is an example of the liquid ejecting head. Still another example of the liquid ejection apparatus is a biochip manufacturing apparatus for manufacturing a biochip. In this case, a bioorganic substance ejection head of the apparatus and a sample ejection head serving as a precision pipette correspond to examples of the liquid ejecting head. The liquid ejection apparatus of the invention includes other industrial liquid ejection apparatuses of industrial application.

Further, the above-described punching method according to the invention is not limited to the application for the case of manufacturing a liquid ejecting head.

What is claimed is:

1. A method of manufacturing a liquid ejection head, comprising:

providing a first metal plate;

supporting the first metal plate on a female die;

forming a plurality of recesses in the first metal plate so as to be arrayed in a first direction;

opposing a male die to the recess, the male die comprising a punch array in which a plurality of punches arrayed in the first direction;

actuating the male die in a second direction perpendicular to the first direction to form a through hole at a bottom portion of each of the recesses with each of the punches;

providing a second metal plate formed with a plurality of nozzle orifices; and joining the first metal plate and the second metal plate such that each of the nozzle orifices is communicated with one of the recesses, wherein:

a contour line of the punch array defined by connecting respective distal end faces of the punches includes a plurality of parts assuming straight lines extending in the first direction; and one of straight lines which is closer to an end of the punch array is farther from the female die than one of the straight lines which is closer to a center of the punch array, in accordance with a warp of the plate member due to the formation of the recesses.

2. A method of manufacturing a liquid ejection head comprising:

supporting the metal plate on a female die;

forming a plurality of recesses in the metal plate so as to be arrayed in a first direction;

opposing a male die to the recess, the male die comprising a punch array in which a plurality of punches arrayed in the first direction;

actuating the male die in a second direction perpendicular to the first direction to form a hole at a bottom portion of each of the recesses with each of the punches, and providing a second metal plate formed with a plurality of nozzle orifices, wherein:

a contour line of the punch array defined by connecting respective distal end faces of the punches includes a plurality of parts assuming straight lines extending in the first direction; and one of said straight lines which is closer to an end of the punch array is farther from the female die than one of the straight lines which is closer to a center of the punch array, in accordance with a warp of the plate member due to the formation of the recesses.

3. The method set forth in claim 2, wherein a section of the bottom portion of each of the recesses in the first direction is V-shaped.

* * * * *